United States Patent
Li

(10) Patent No.: US 10,609,334 B2
(45) Date of Patent: Mar. 31, 2020

(54) GROUP VIDEO COMMUNICATION METHOD AND NETWORK DEVICE

(71) Applicant: TENCENT TECHNOLOGY (SHENZHEN) COMPANY LIMITED, Shenzhen (CN)

(72) Inventor: Kai Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/435,733

(22) Filed: Jun. 10, 2019

(65) Prior Publication Data

US 2019/0297304 A1    Sep. 26, 2019

Related U.S. Application Data

(63) Continuation of application No. PCT/CN2018/075749, filed on Feb. 8, 2018.

(30) Foreign Application Priority Data

Feb. 24, 2017 (CN) .......................... 2017 1 0104439
Feb. 24, 2017 (CN) .......................... 2017 1 0104442
Feb. 24, 2017 (CN) .......................... 2017 1 0104669

(51) Int. Cl.
*H04N 7/15* (2006.01)
*G06T 7/70* (2017.01)
(Continued)

(52) U.S. Cl.
CPC ............. *H04N 7/157* (2013.01); *G06F 3/013* (2013.01); *G06K 9/00268* (2013.01);
(Continued)

(58) Field of Classification Search
CPC combination set(s) only.
See application file for complete search history.

(56) References Cited

U.S. PATENT DOCUMENTS 8,683,353 B2    3/2014 Buhrke et al.
2009/0249226 A1    10/2009 Manolescu et al.
(Continued)

FOREIGN PATENT DOCUMENTS

| CN | 102164265 A | 8/2011 |
|---|---|---|
| CN | 103238317 A | 8/2013 |
| CN | 105721821 A | 6/2016 |

OTHER PUBLICATIONS

The World Intellectual Property Organization (WIPO) International Search Report for PCT/CN2018/075749 Apr. 26, 2018 5 Pages (including translation).

*Primary Examiner* — Phung-Hoang J Nguyen
(74) *Attorney, Agent, or Firm* — Anova Law Group, PLLC

(57) ABSTRACT

A group video communication method and a network device are provided. A user type of each user in a group video session is determined according to device information of the user. The user type includes: common user indicating that the user uses a two-dimensional display mode when participating in the group video session, and virtual user indicating that the user uses a virtual reality (VR) display mode when participating in the group video session. Video data of the group video session is processed according to a video display mode indicated by the user type to obtain target video data of the user. The target video data is sent to a user equipment of the user during the group video session, so that the user equipment presents the target video data of the group video session in the video display mode indicated by the user type of the user.

18 Claims, 18 Drawing Sheets

(51) Int. Cl.
  *G06F 3/01*    (2006.01)
  *G06K 9/00*    (2006.01)
  *G06T 7/20*    (2017.01)
  *G06T 13/40*   (2011.01)
  *G06T 17/00*   (2006.01)
  *H04N 7/14*    (2006.01)
  *H04N 13/204*  (2018.01)

(52) U.S. Cl.
  CPC ............ *G06K 9/00302* (2013.01); *G06T 7/20* (2013.01); *G06T 7/70* (2017.01); *G06T 13/40* (2013.01); *G06T 17/00* (2013.01); *H04N 7/147* (2013.01); *H04N 7/15* (2013.01); *G06T 2207/10016* (2013.01); *G06T 2207/30201* (2013.01); *H04N 13/204* (2018.05)

(56) References Cited

U.S. PATENT DOCUMENTS

| | | |
|---|---|---|
| 2011/0279634 A1 | 11/2011 | Periyannan et al. |
| 2012/0116953 A1* | 5/2012 | Marin ................ G06Q 10/0633 705/38 |
| 2014/0085406 A1 | 3/2014 | Narayanan |
| 2014/0096036 A1 | 4/2014 | Mohler |
| 2014/0208238 A1* | 7/2014 | Leahy ................... H04W 4/029 715/757 |
| 2016/0187969 A1 | 6/2016 | Larsen et al. |
| 2018/0063483 A1* | 3/2018 | Namgung ............ H04N 13/271 |
| 2018/0189554 A1* | 7/2018 | Sutton ..................... G06T 13/40 |
| 2019/0052858 A1* | 2/2019 | Yip ........................ H04N 5/232 |

* cited by examiner (a)

(b)

GROUP VIDEO COMMUNICATION METHOD AND NETWORK DEVICE

CROSS-REFERENCES TO RELATED APPLICATIONS

This application is a continuation application of PCT Patent Application No. PCT/CN2018/075749, filed on Feb. 8, 2018, which claims priority to China Patent Application No. 201710104439.2, No. 201710104442.4, and No. 201710104669.9, filed with the Chinese Patent Office on Feb. 24, 2017 and entitled "GROUP VIDEO COMMUNICATION METHOD AND APPARATUS", the entire contents of all of which are incorporated herein by reference.

FIELD OF TECHNOLOGY

The present disclosure relates to the field of virtual reality (VR) technologies, and in particular, to a group video communication method and a network device.

BACKGROUND OF THE DISCLOSURE

The VR technology is a technology that can be used for creating and experiencing a virtual world. A vivid environment can be simulated, and behaviors of a user can be sensed intelligently, so that the user has an immersive experience. Therefore, social applications of the VR technology attract extensive attention, and a group video communication method based on the VR technology emerges.

Currently, during a group video session, a server may create a virtual environment for a plurality of virtual users using VR devices, and superimpose virtual characters selected by the virtual users on the virtual environment, to express images of the virtual users in the virtual environment. Further, the server can send, to the virtual users, a video in which audio and the images of the virtual users are superimposed, thereby bringing visual and auditory experience to the virtual users, so that the virtual users feel as if they are talking freely with other virtual users in the virtual world.

During implementation of the present disclosure, the inventor finds that the existing technology at least has the following problems:

The group video session can only be performed between virtual users. However, VR devices are not popularized yet nowadays, and there are large communication barriers between many common users not using VR devices and virtual users, resulting in strong restrictiveness and poor flexibility of the group video session.

SUMMARY

Embodiments of the present disclosure provide a group video communication method and a network device, so that a group video session can be performed between users of different types without restrictions, thereby improving the flexibility of the group video session. The technical solutions are as follows:

According to an aspect, a group video communication method is provided. The method may be implemented by a network device and include: creating a group video session; and for each user in the group video session, determining a user type of the user according to device information of the user. The user type includes common user and virtual user, the common user indicating that the user uses a two-dimensional display mode when participating in the group video session, and the virtual user indicating that the user uses a virtual reality (VR) display mode when participating in the group video session. The method also includes: for each user in the group video session, obtaining target video data of the user by processing video data of the group video session according to a video display mode indicated by the user type of the user, a video display mode of the target video data matching with the video display mode indicated by the user type of the user; and sending the target video data to a user equipment of the user during the group video session, so that the user equipment presents the target video data of the group video session in the video display mode indicated by the user type of the user.

According to an aspect, a group video communication method is provided, the method including: receiving target video data of a group video session sent by a server, a video display mode of the target video data matching with a video display mode indicated by a user type of a terminal user, the user type of the terminal user being common user, and the common user being used for indicating that the terminal user uses a two-dimensional display mode when participating in the group video session; and displaying the target video data, so that each common user in the group video session is displayed in a form of a two-dimensional character, and each virtual user in the group video session is displayed in a form of a two-dimensional virtual character.

According to an aspect, a group video communication method is provided, the method including: receiving target video data of a group video session sent by a server, a video display mode of the target video data matching with a video display mode indicated by a user type of a VR device user, the user type of the VR device user being virtual user, and the virtual user being used for indicating that the VR device user uses a VR display mode when participating in the group video session; and displaying the target video data, so that each common user in the group video session is displayed in a form of a two-dimensional character or a three-dimensional character in a virtual environment, and each virtual user in the group video session is displayed in a form of a three-dimensional virtual character in the virtual environment.

According to an aspect, a group video session apparatus is provided, the apparatus including: a creation module, configured to create a group video session; a determining module, configured to determine, for each user in the group video session, a user type of the user according to device information of the user, the user type including common user and virtual user, the common user being used for indicating that the user uses a two-dimensional display mode when participating in the group video session, and the virtual user being used for indicating that the user uses a VR display mode when participating in the group video session; a processing module, configured to process video data of the group video session according to a video display mode indicated by the user type of the user, to obtain target video data of the user, a video display mode of the target video data matching with the video display mode indicated by the user type of the user; and a sending module, configured to send the target video data to a user equipment of the user during the group video session, so that the user performs the group video session.

According to an aspect, a group video session apparatus is provided, the apparatus including: a receiving module, configured to receive target video data of a group video session sent by a server, a video display mode of the target video data matching with a video display mode indicated by a user type of a terminal user, the user type of the terminal user being common user, and the common user being used for indicating that the terminal user uses a two-dimensional display mode when participating in the group video session; and a display module, configured to display the target video data, so that each common user in the group video session is displayed in a form of a two-dimensional character, and each virtual user in the group video session is displayed in a form of a two-dimensional virtual character.

According to an aspect, a group video session apparatus is provided, the apparatus including: a receiving module, configured to receive target video data of a group video session sent by a server, a video display mode of the target video data matching with a video display mode indicated by a user type of a VR device user, the user type of the VR device user being virtual user, and the virtual user being used for indicating that the VR device user uses a VR display mode when participating in the group video session; and a display module, configured to display the target video data, so that each common user in the group video session is displayed in a form of a two-dimensional character or a three-dimensional character in a virtual environment, and each virtual user in the group video session is displayed in a form of a three-dimensional virtual character in the virtual environment.

According to an aspect, a network device is provided, where the network device includes a memory and a processor, the memory is configured to store instructions, and the processor is configured to execute the instructions, so as to perform: creating a group video session; and for each user in the group video session, determining a user type of the user according to device information of the user. The user type includes common user and virtual user, the common user indicating that the user uses a two-dimensional display mode when participating in the group video session, and the virtual user indicating that the user uses a virtual reality (VR) display mode when participating in the group video session. The processor is also configured to perform: for each user in the group video session, obtaining target video data of the user by processing video data of the group video session according to a video display mode indicated by the user type of the user, a video display mode of the target video data matching with the video display mode indicated by the user type of the user; and sending the target video data to a user equipment of the user during the group video session, so that the user equipment presents the target video data of the group video session in the video display mode indicated by the user type of the user.

According to an aspect, a non-transitory computer-readable storage medium storing computer program instructions is provided. The computer program instructions, when being executed by at least one processor, cause the at least one processor to perform: creating a group video session; and for each user in the group video session, determining a user type of the user according to device information of the user. The user type includes common user and virtual user, the common user indicating that the user uses a two-dimensional display mode when participating in the group video session, and the virtual user indicating that the user uses a virtual reality (VR) display mode when participating in the group video session. The computer program instructions also cause the at least one processor to perform: for each user in the group video session, obtaining target video data of the user by processing video data of the group video session according to a video display mode indicated by the user type of the user, a video display mode of the target video data matching with the video display mode indicated by the user type of the user; and sending the target video data to a user equipment of the user during the group video session, so that the user equipment presents the target video data of the group video session in the video display mode indicated by the user type of the user.

According to an aspect, a terminal is provided, where the terminal includes a memory and a processor, the memory is configured to store instructions, and the processor is configured to execute the instructions, so as to perform the following steps of a group video communication method: receiving target video data of a group video session sent by a network device, a video display mode of the target video data matching with a video display mode indicated by a user type of a terminal user, the user type of the terminal user being common user, and the common user being used for indicating that the terminal user uses a two-dimensional display mode when participating in the group video session; and displaying the target video data, so that each common user in the group video session is displayed in a form of a two-dimensional character, and each virtual user in the group video session is displayed in a form of a two-dimensional virtual character.

According to an aspect, a VR device is provided, where the VR device includes a memory and a processor, the memory is configured to store instructions, and the processor is configured to execute the instructions, so as to perform the following steps of a group video communication method: receiving target video data of a group video session sent by a network device, a video display mode of the target video data matching with a video display mode indicated by a user type of a VR device user, the user type of the VR device user being virtual user, and the virtual user being used for indicating that the VR device user uses a VR display mode when participating in the group video session; and displaying the target video data, so that each common user in the group video session is displayed in a form of a two-dimensional character or a three-dimensional character in a virtual environment, and each virtual user in the group video session is displayed in a form of a three-dimensional virtual character in the virtual environment.

According to an aspect, a group video session system is provided, the system including: a network device, configured to create a group video session; determine, for each user in the group video session, a user type of the user according to device information of the user, the user type including common user and virtual user, the common user being used for indicating that the user uses a two-dimensional display mode when participating in the group video session, and the virtual user being used for indicating that the user uses a VR display mode when participating in the group video session; process video data of the group video session according to a video display mode indicated by the user type of the user, to obtain target video data of the user, a video display mode of the target video data matching with the video display mode indicated by the user type of the user; and send the target video data to a user equipment of the user during the group video session, so that the user performs the group video session; a terminal, configured to receive the target video data of the group video session sent by the network device, a video display mode of the target video data matching with a video display mode indicated by a user type of a terminal user, the user type of the terminal user being common user, and the common user being used for indicating that the terminal user uses a two-dimensional display mode when participating in the group video session; and display the target video data, so that each common user in the group video session is displayed in a form of a two-dimensional character, and each virtual user in the group video session is displayed in a form of a two-dimensional virtual character; and a VR device, configured to receive the target video data of the group video session sent by the network device, a video display mode of the target video data matching with a video display mode indicated by a user type of a VR device user, the user type of the VR device user being virtual user, and the virtual user being used for indicating that the VR device user uses a VR display mode when participating in the group video session; and display the target video data, so that each common user in the group video session is displayed in a form of a two-dimensional character or a three-dimensional character in a virtual environment, and each virtual user in the group video session is displayed in a form of a three-dimensional virtual character in the virtual environment.

According to an aspect, a group video communication method is provided, including: obtaining a virtual character of a first user in a group video session, the virtual character of the first user being obtained at least according to head feature data of the first user and a body model corresponding to the first user; obtaining video data of the first user based on the virtual character of the first user and behavior feature data of the first user during the group video session, a movement of the virtual character of the first user in the video data matching with an actual movement of the first user; and sending the video data of the first user to a terminal of a second user participating in the group video session, so as to implement the group video session.

According to an aspect, a group video session apparatus is provided, the apparatus including: a virtual character obtaining module, configured to obtain a virtual character of a first user in a group video session, the virtual character of the first user being obtained at least according to head feature data of the first user and a body model corresponding to the first user; a video data obtaining module, configured to obtain video data of the first user based on the virtual character of the first user and behavior feature data of the first user during the group video session, a movement of the virtual character of the first user in the video data matching with an actual movement of the first user; and a sending module, configured to send the video data of the first user to a terminal of a second user participating in the group video session, so as to implement the group video session.

According to an aspect, a VR device is provided, where the VR device includes a memory and a processor, the memory is configured to store instructions, and the processor is configured to execute the instructions, so as to perform the following steps of a group video communication method: obtaining a virtual character of a first user in a group video session, the virtual character of the first user being obtained at least according to head feature data of the first user and a body model corresponding to the first user; obtaining video data of the first user based on the virtual character of the first user and behavior feature data of the first user during the group video session, a movement of the virtual character of the first user in the video data matching with an actual movement of the first user; and sending the video data of the first user to a terminal of a second user participating in the group video session, so as to implement the group video session.

According to an aspect, a network device is provided, where the network device includes a memory and a processor, the memory is configured to store instructions, and the processor is configured to execute the instructions, so as to perform the following steps of a group video communication method: obtaining a virtual character of a first user in a group video session, the virtual character of the first user being obtained at least according to head feature data of the first user and a body model corresponding to the first user; obtaining video data of the first user based on the virtual character of the first user and behavior feature data of the first user during the group video session, a movement of the virtual character of the first user in the video data matching with an actual movement of the first user; and sending the video data of the first user to a terminal of a second user participating in the group video session, so as to implement the group video session.

According to an aspect, a group video communication method is provided, including: obtaining, during a group video session, a three-dimensional interaction model of a target object to be displayed; processing the three-dimensional interaction model of the target object during the group video session according to a visual angle of each user of a plurality of users in the group video session, to obtain video data of the user, the video data of the user including model data obtained by performing visual angle conversion on the three-dimensional interaction model of the target object; and sending the video data of the plurality of users to terminals of the plurality of users respectively.

According to an aspect, a group video session apparatus is provided, the apparatus including: an interaction model obtaining module, configured to obtain, during a group video session, a three-dimensional interaction model of a target object to be displayed; a processing module, configured to process the three-dimensional interaction model of the target object according to a visual angle of each user of a plurality of users in the group video session, to obtain video data of the user, the video data of the user including model data obtained by performing visual angle conversion on the three-dimensional interaction model of the target object; and a sending module, configured to send the video data of the plurality of users to terminals of the plurality of users respectively.

According to an aspect, a network device is provided, where the network device includes a memory and a processor, the memory is configured to store instructions, and the processor is configured to execute the instructions, so as to perform the following steps of a group video communication method: obtaining, during a group video session, a three-dimensional interaction model of a target object to be displayed; processing the three-dimensional interaction model of the target object during the group video session according to a visual angle of each user of a plurality of users in the group video session, to obtain video data of the user, the video data of the user including model data obtained by performing visual angle conversion on the three-dimensional interaction model of the target object; and sending the video data of the plurality of users to terminals of the plurality of users respectively.

According to the embodiments of the present disclosure, a user type of each user in a group video session is determined, and video data of the group video session is processed according to the user type, so that when the user type is virtual user, target video data matching with a VR display mode indicated by the virtual user can be obtained, and when the user type is common user, target video data matching with a two-dimensional display mode indicated by the common user can be obtained. Therefore, proper display modes are used to display video data for users of different types, so that a group video session can be performed between users of different types without restrictions, thereby improving the flexibility of the group video session.

BRIEF DESCRIPTION OF THE DRAWINGS

To describe the technical solutions of the embodiments of the present disclosure or the prior art more clearly, the accompanying drawings for illustrating the embodiments will be introduced briefly in the following. Apparently, the drawings in the following description are only some embodiments of the present disclosure, and a person of ordinary skill in the art may obtain other drawings based on these accompanying drawings without creative efforts.

DESCRIPTION OF EMBODIMENTS

To make the objectives, technical solutions and advantages of the present disclosure clearer, the implementations of the present disclosure are described in further detail with reference to the accompanying drawings.

Figure 1:
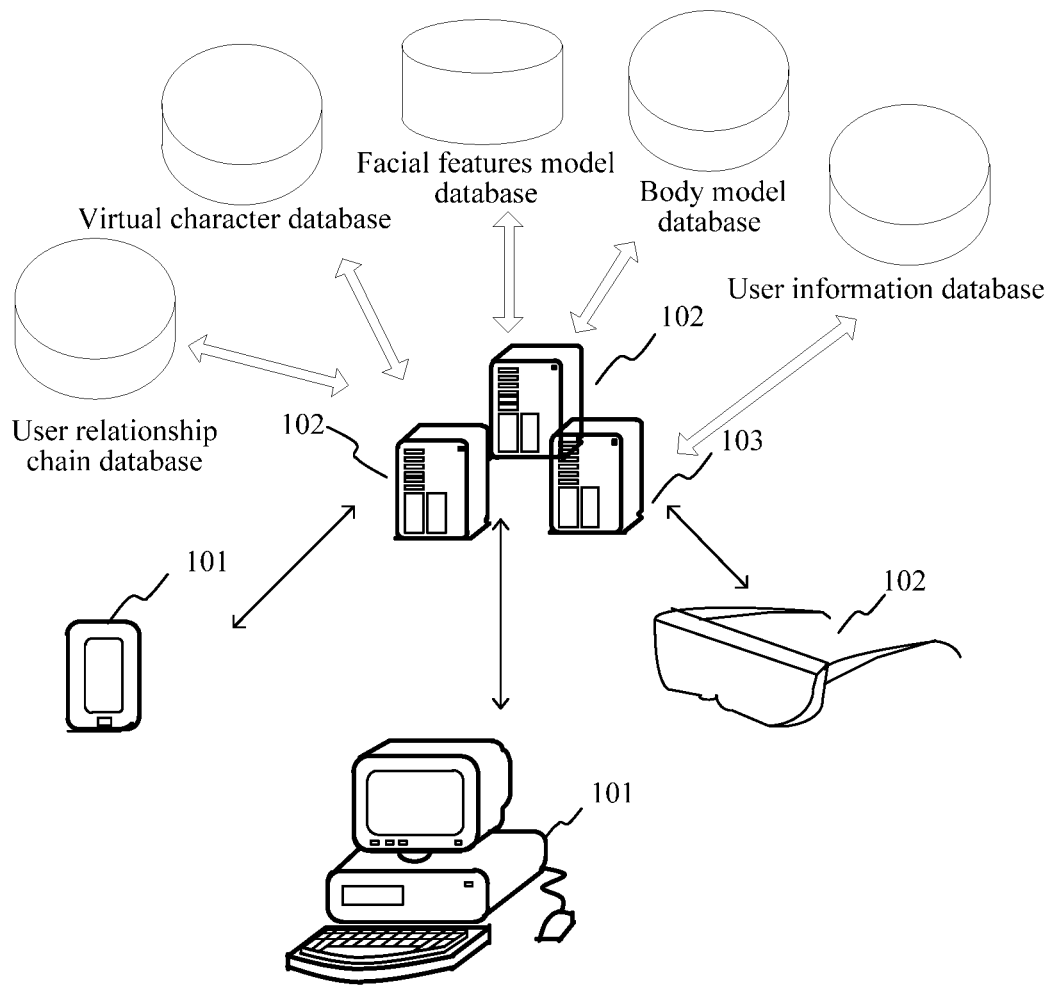
FIG. 1 is a schematic diagram of an implementation environment of a group video session according to an embodiment of the present disclosure.

FIG. 1 is a schematic diagram of an implementation environment of a group video session according to an embodiment of the present disclosure. Referring to FIG. 1, the implementation environment includes:

at least one terminal 101 (such as a mobile terminal and a tablet computer), at least one VR device 102, and at least one server 103. An interaction process among the terminal 101, the VR device 102, and the server 103 may correspond to a group video session process in the following embodiment. The server 103 is configured to create a group video session for users of different types, receive and process video data sent by the terminal 101 and the VR device 102, and send processed video data to the terminal 101 or the VR device 102, so that the group video session can be performed between users of different types. The terminal 101 is configured send video data captured by a camera to the server 103 in real time, and receive and display the video data processed by the server 103. The VR device 102 is configured to send behavior feature data of a user captured by a sensor device to the server 103, and receive and display the video data processed by the server 103.

The server 103 may further be configured to obtain a virtual character of a user using the terminal 101 or the VR device 102, and obtain video data based on the virtual character and behavior feature data of the user. The terminal 101 is configured to receive and display the video data sent by the server 103. The VR device 102 may also be configured to obtain a virtual character of a user of the VR device 102, and obtain video data based on the virtual character and behavior feature data of the user.

In addition, at least one database, such as a facial features model database, a body model database, a virtual character database, user information database, and a user relationship chain database, may further be configured on the server 103. The facial features model database is used for storing cartoon facial features models; the body model database is used for storing cartoon body models, and the body model database may further store dress; the virtual character database is used for storing user identifiers and virtual characters of users in a corresponding manner; the user information database is at least used for storing user attributes of users, such as age data, gender data, and occupation data; and the user relationship chain database is used for storing user relationship chain data of users. For example, the user relationship chain data is at least used for indicating users having a friendship or group relationship with the user.

It should be noted that, when the VR device 102 is configured to obtain a virtual character, the VR device 102 may obtain facial features models, a body model or a virtual character from at least one database configured on the server 103. Moreover, the virtual character (including a head model and a body model) in the embodiments of the present disclosure may be in a three-dimensional form.

Figure 2:
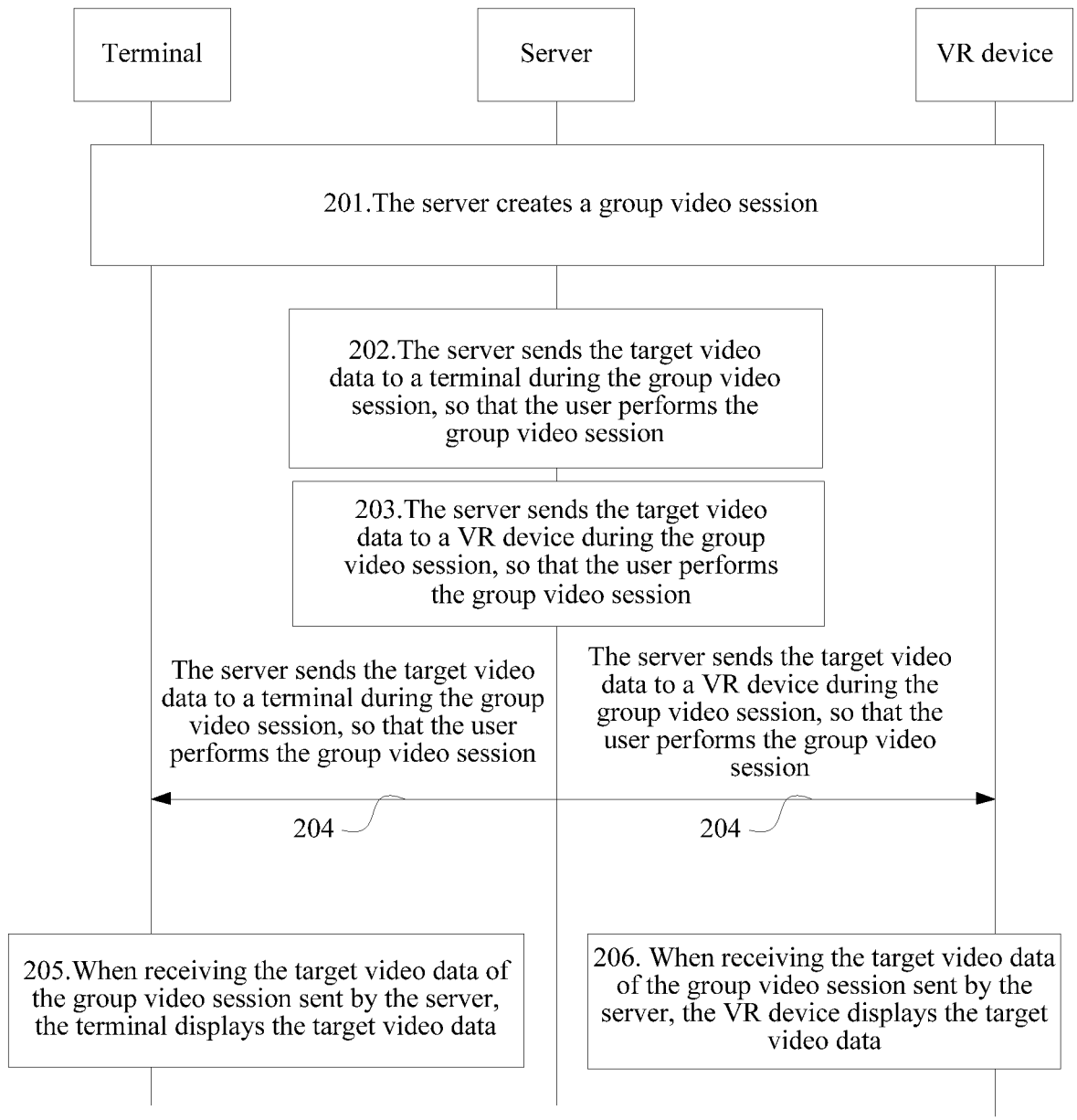
FIG. 2 is a flowchart of a group video communication method according to an embodiment of the present disclosure.

FIG. 2 is a flowchart of a group video communication method according to an embodiment of the present disclosure. Referring to FIG. 2, the method is applied to an interaction process among a server, a terminal, and a VR device.

201: A server creates a group video session.

The group video session refers to a video session performed by a plurality of (two or more) users based on the server. The plurality of users may be a plurality of users on a social platform corresponding to the server, and the plurality of users may have a group relationship or a friendship.

In this step, the server may create a group video session when receiving a group video session request from any user equipment. An initiation manner of the group video session request is not limited in the embodiments of the present disclosure. For example, a user initiates, in an established group, a group video session request to all users in the group. In this example, the group video session request may carry a group identifier of the group, so that the server can obtain a user identifier of each user in the group according to the group identifier. For another example, the user may select some users from the established group or a user relationship chain, and then initiate a group video session request. In this example, the group video session request may carry a user identifier of the user and user identifiers of the selected users. After obtaining the user identifiers, the server may add the users corresponding to the user identifiers to a group video session, thereby creating a group video session.

202: The server determines, for each user in the group video session, a user type of the user according to device information of the user.

The device information may be a device model of a user equipment with which the user logs into the server. An expression form of the device model may be as follows: mobile phone brand+mobile phone model, so that the server can determine a device type of the user equipment according to a correspondence between the device model and the device type. The device type may be personal computer (PC) terminal, mobile terminal, or VR device.

In this step, the server may obtain the device information in multiple manners. For example, when the user equipment sends a login request to the server, the login request may carry a user identifier and device information, so that the server can extract the user identifier and the device information when receiving the login request, and stores the user identifier and the device information in a corresponding manner; alternatively, the server sends a device information obtaining request to the user equipment, so that the user equipment sends the device information to the server.

Users in the group video session may use different user equipment/devices to log into the server, and different user devices support different video display modes (a VR device supports a VR display mode, and a terminal supports a two-dimensional display mode). Therefore, the server needs to process video data in different manners for users using different user devices, so as to obtain video data matching with the video display modes supported by the user devices. To determine how to process video data for a user, the server first needs to determine a user type of the user. The user type includes common user and virtual user. The common user is used for indicating that the user uses a two-dimensional display mode when participating in the group video session. If the user is a common user, it indicates that the user is a user that logs into the server by using a non-VR device. The non-VR device includes, for example, a mobile terminal, and a tablet computer. The virtual user is used for indicating that the user uses a VR display mode when participating in the group video session. If the user is a virtual user, it indicates that the user is a user that logs into the server by using a VR device.

In this step, the server may query the user type corresponding to the device information of the user according to a pre-configured correspondence among device information, device types, and user types. Refer to Table 1 for an example of the correspondence:

TABLE 1

| Device information | Device type | User type |
|---|---|---|
| XX ThinkPad | PC terminal | Common user |
| WW N7 | Mobile terminal | Common user |
| UU VR | VR device | Virtual user |

In fact, the users may also set device information on their own. For example, a device information setting page is provided on a VR device, and a VR device user may set "WW N7" as current device information, or may reserve "UU N7" set by default, so that the server can obtain the device information set by the VR device user, thereby determining a user type that the VR device user tends to experience.

203: The server processes video data of the group video session according to a video display mode indicated by the user type of the user, to obtain target video data of the user.

A video display mode of the target video data matches with the video display mode indicated by the user type of the user. In this step, if the user type of the user is common user, the server determines that the user uses the two-dimensional display mode when participating in the current group video session, and uses a video data processing manner corresponding to the two-dimensional display mode for the user. If the user type of the user is virtual user, the server determines that the user uses the VR display mode when participating in the current group video session, and uses a video data processing manner corresponding to the VR display mode for the user. A specific processing procedure is not limited in the embodiments of the present disclosure. The following describes the video data processing manner corresponding to each user type:

A processing procedure includes the following steps 203A to 203C when the user type is common user:

203A: The server converts a three-dimensional virtual character corresponding to each virtual user in the group video session into a two-dimensional virtual character if the user type of the user is common user.

The three-dimensional virtual character is used for expressing a character image of a virtual user by using three-dimensional image data, so that the user can be displayed as a three-dimensional virtual character during the group video session. In this step, the server may obtain the three-dimensional virtual character in multiple manners. For example, before the virtual user confirms to join the group video session, a plurality of three-dimensional virtual characters is provided for the virtual user, and a three-dimensional virtual character selected by the virtual user is used as the three-dimensional virtual character corresponding to the virtual user. For another example, the server obtains a user attribute of the virtual user, and uses a three-dimensional virtual character matching with the user attribute as the three-dimensional virtual character corresponding to the virtual user. In this example, the user attribute includes information such as age, gender, and occupation. Using the user attribute of the virtual user being a 30-year-old female teacher as an example, the server may select a three-dimensional virtual character with a female teacher image as the three-dimensional virtual character corresponding to the virtual user.

Further, based on the obtained three-dimensional virtual character, the server may convert the three-dimensional virtual character into a two-dimensional virtual character. It should be noted that, the two-dimensional virtual character may be static or dynamic, which is not limited in the embodiments of the present disclosure. For example, to save computing resources of the server, two-dimensional image data at a specific visual angle may be directly extracted from three-dimensional image data corresponding to the three-dimensional virtual character, and the two-dimensional image data at the visual angle is used as the two-dimensional virtual character. To express the virtual user as comprehensively as possible, the visual angle may be a front visual angle. For another example, to present behaviors of the virtual user vividly, the server may obtain the three-dimensional virtual character and behavior feature data of the virtual user which is captured by the VR device, where the behavior feature data includes expression feature data or body feature data of the virtual user. Further, the server may determine a behavior feature of the three-dimensional virtual character according to the behavior feature data, and generate a three-dimensional virtual character conforming to the behavior feature, so that a behavior of the three-dimensional virtual character is synchronous with a behavior of the virtual user. Then, the server converts the three-dimensional virtual character into a two-dimensional virtual character. For the specific processing procedure, reference may be made to the procedure shown in FIG. 10 below, and details are not described herein.

203B: The server synthesizes the two-dimensional virtual character, a two-dimensional background selected by the virtual user, and audio data corresponding to the virtual user, to obtain first two-dimensional video data. Synthesizing, as used herein, may refer to a processing operation that integrates certain materials into a target video, or generating a target video by integrating certain materials. Such materials may include virtual character model (e.g., a 2D or 3D model of a user), virtual object model (e.g., a 2D or 3D model of an exhibit for discussion), background resource (e.g., a VR background environment model or a 2D background image), video depicting a part of scene(s) of the target video (e.g., a 2D or 3D video), etc. The target video may be a three-dimensional video or a two-dimensional video.

Based on the two-dimensional virtual character obtained in step 203A, to provide richer visual effects for the user, the server may further add a two-dimensional background to the two-dimensional virtual character. The two-dimensional background refers to a background of the two-dimensional virtual character, for example, a two-dimensional conference background and a two-dimensional beach background. The server may provide a plurality of two-dimensional backgrounds for the virtual user before the virtual user joins the group video session, or obtain a two-dimensional background selected by the virtual user. In fact, the server may also obtain the two-dimensional background in other manners. For example, the server may obtain the two-dimensional background corresponding to the virtual user randomly. For another example, to provide users in the group video session with experience effects as identical as possible, the server may use two-dimensional image data mapped from the virtual environment corresponding to the group video session as the two-dimensional background. Alternatively, the server may obtain a label of the virtual environment, and use two-dimensional image data with the same label as the two-dimensional background. For example, if the label of the virtual environment is "forest", the server may use two-dimensional image data with the label "forest" as the two-dimensional background. Definitely, the two-dimensional background may be static or dynamic.

In this step, the server may determine a display position and a synthesis size of the two-dimensional virtual character on the two-dimensional background, adjust an original display size of the two-dimensional virtual character to obtain a two-dimensional virtual character conforming to the synthesis size, and synthesize the two-dimensional virtual character to the corresponding display position on the two-dimensional background. The synthesis size, as used herein, may refer to, a size (e.g., model size, file size, resolution, bit rate, frame rate, and/or sampling rate, etc.) of a corresponding material (e.g., a model, a video, etc.) to be integrated into a target video. Moreover, the layer of the two-dimensional virtual character is above the layer of the two-dimensional background, thereby obtaining image data corresponding to the virtual user currently. In fact, the server may also determine a display area corresponding to the display position and the synthesis size on the two-dimensional background, remove pixels in the display area, and embed image data corresponding to the two-dimensional virtual character into the display area, thereby using the embedded two-dimensional image data as the image data corresponding to the virtual user currently.

When any user speaks during the group video session, the user equipment may send recorded audio data to the server in real time. Therefore, when receiving the audio data corresponding to the virtual user, the server may synthesize the current image data with the audio data, to obtain first two-dimensional video data, thereby expressing current words and deeds of the virtual user. Definitely, if the user does not receive audio data corresponding to the virtual user currently, the current image data can be used as the first two-dimensional video data directly.

203C: The server obtains the target video data of the user by integrating the first two-dimensional video data of at least one virtual user and second two-dimensional video data.

The second two-dimensional video data refers to two-dimensional video data of a common user in the group video session. In some embodiments, the server determines a display position and a synthesis size of current two-dimensional video data of each user in the group video session, and synthesizes the current video data of each user and the virtual environment into one piece of two-dimensional video data according to the determined display position and synthesis size. Moreover, the layer of the two-dimensional video data of the user is above the layer of the virtual environment, and the synthesized two-dimensional video data is used as the target video data of the user. In some embodiments, for different users, the server may generate different target video data by selectively integrating video data of one or more virtual users and video data one or more common users. For example, when participants of the group video session is above certain threshold, and/or when user A cannot see certain users from his/her current viewing angle/scale at current position in the virtual group video session environment, video data of certain participants may be excluded from the integrated target video designated for user A. In this way, the size of target video data may be reduced and the network communication resource may be saved. In some other embodiments, the target video of user A may be divided into multiple sections, each section including video data of different users of the group video session. The multiple sections may be sent to user equipment of user A at different priority or time (e.g., video section including a user within user A's viewing field has higher priority, video section including a user currently speaking is sent earlier, video section including a user that has high-frequency interaction history or subscription with user A has higher priority, etc.).

It should be noted that, the two synthesis process steps 202B and 202C may also correspond to one synthesis process, and in this synthesis process, the server omits the step of synthesizing the first two-dimensional video data, and directly synthesizes the two-dimensional virtual character, the two-dimensional background, the audio data corresponding to the virtual user, and the second two-dimensional video data, to obtain the target video data.

A processing procedure includes the following steps 203D to 203H when the user type is virtual user:

203D: The server determines a virtual environment corresponding to the group video session if the user type of the user is virtual user.

The virtual environment refers to a three-dimensional background when the virtual user is in the group video session, for example, a round-table conference virtual environment, a beach virtual environment, a board game virtual environment, and other three-dimensional images. A specific manner for determining the virtual environment is not limited in the embodiments of the present disclosure. For example, the server may use the following three determining manners:

In the first determining manner, the server determines a virtual environment corresponding to a virtual environment option triggered by the user as the virtual environment corresponding to the user in the group video session.

To make the virtual environment providing process more user-friendly, the server may provide a variety of virtual environments, and the user selects a virtual environment for the group video session freely. In this determining manner, the server may provide at least one virtual environment option and a corresponding virtual environment thumbnail on the VR device (or a terminal bound to the VR device), and each virtual environment option corresponds to one virtual environment. When detecting a trigger operation on a specific virtual environment option by the virtual user, the VR device may send a virtual environment identifier corresponding to the virtual environment option to the server. When obtaining the virtual environment identifier, the server may determine a virtual environment corresponding to the virtual environment identifier as the virtual environment of the user during the group video session.

In the second determining manner, a virtual environment capacity corresponding to the group video session is determined according to a quantity of users in the group video session, and a virtual environment meeting the capacity is determined as the virtual environment corresponding to the group video session.

To present a proper virtual environment to the user and avoid the virtual environment from being crowded or spacious, in this determining manner, the server may obtain the quantity of users in the group video session, thereby determining a capacity that the virtual environment ought to have. The capacity is used for indicating the quantity of users that can be accommodated in the virtual environment. For example, the capacity of a round-table conference virtual environment corresponds to a seat quantity in the virtual environment. Further, the server may select, from a plurality of stored virtual environments according to the determined capacity, one virtual environment closest to the capacity. For example, the quantity of users is 12, the server stores three round-table conference virtual environments, and seat quantities in the three round-table conference virtual environments are 5, 10, and 15 respectively. Therefore, the server may determine a round-table conference virtual environment with a seat quantity of 10 as the virtual environment corresponding to the user during the group video session.

In the third determining manner, virtual environments that have been selected by each user in the group video session are analyzed, to obtain the number of times that each virtual environment is selected, and a virtual environment that is selected for the largest number of times is determined as the virtual environment corresponding to the group video session.

In this determining manner, the server comprehensively analyzes virtual environments that have been selected by each user, thereby obtaining a virtual environment preferred by more users. For example, the group video session includes five users, and virtual environments that have been selected by each user are shown in Table 2. Therefore, the server can determine, according to Table 2, that the virtual environment 1 is selected for the largest number of times (four times), and determine the virtual environment 1 as the virtual environment corresponding to the user during the group video session.

TABLE 2

| User | Virtual environment |
|------|---------------------|
| A | virtual environment 1, virtual environment 2 |
| B | virtual environment 3 |
| C | virtual environment 1 |
| D | virtual environment 1, virtual environment 3 |
| E | virtual environment 1 |

It should be noted that, in the foregoing three determining manners, to save computing resources of the server, after the server determines a virtual environment for a specific user, the virtual environment corresponding to the user can be directly determined as a virtual environment corresponding to each virtual user in the group video session.

In fact, any two of the foregoing three determining manners or the three determining manners may also be combined, and a combination manner is not limited in the embodiments of the present disclosure. For example, the first determining manner is combined with the third determining manner, and if the server receives a virtual environment identifier triggered by the user, the server determines a virtual environment corresponding to the virtual environment identifier; otherwise, the server uses the third determining manner.

203E: The server determines a display position of each user of the group video session in the virtual environment by using the virtual environment as a three-dimensional background.

Figure 3:
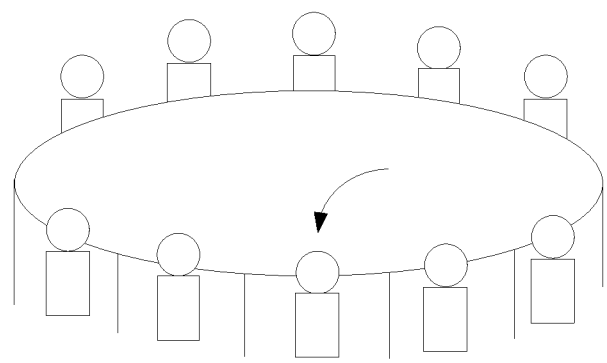
FIG. 3 is a schematic diagram of user display positions according to an embodiment of the present disclosure.

In this step, to help the users in the group video session to be better integrated with the virtual environment, the server needs to determine a display position of each user in the virtual environment. The display position refers to a synthesis position of video data of a common user or a synthesis position of a three-dimensional virtual character of a virtual user. The manner for determining the display position is not limited in the embodiments of the present disclosure. For example, for the user, a visual angle of the user may be considered as a front visual angle by default, so that the orientation of the three-dimensional virtual character corresponding to the user is the consistent with the front visual angle. Therefore, the user may be displayed or not displayed in the group video session. If the user is displayed, referring to FIG. 3, the user may correspond to the display position pointed to by the arrow in FIG. 3. In addition, for other users, the server may determine display positions in the following five determining manners (a determining manner 1 to a determining manner 5).

In the determining manner 1, according to social data between the user and other users in the group video session, degrees of intimacy between the user and the other users are analyzed, and display positions of the other users are arranged starting from any side of the user in descending order of the degrees of intimacy.

To create a more vivid session scenario, in this determining manner, a social tendency of each user during the actual session is taken into consideration, and the display position of each user is determined according to the degree of intimacy. The social data is not limited to the number of chats, duration of friendship, the number of comments and likes, and other data. The method for analyzing the degrees of intimacy is not limited in the embodiments of the present disclosure. For example, C is used to represent the degree of intimacy, chat is used to represent the number of chats, and the weight is 0.4; time is used to represent the duration of friendship, and the weight is 0.3; comment is used to represent the number of comments and likes, and the weight is 0.3. In this case, the degree of intimacy may be expressed as follows:

$$C=0.4*chat+0.3*time+0.3*comment$$

Therefore, if the other users are a user 1, a user 2, a user 3, and a user 4, social data between the user and the other users is as shown in Table 3, where C1, C2, C3, and C4 are used to represent degrees of intimacy between these users and the user, C1 is 37, C2 is 4, C3 is 82, and C4 is 76. Therefore, the server can determine a position closest to the user as a display position of the user 3, and arrange display positions of the user 4, the user 1, and the user 2 sequentially in descending order of the degrees of intimacy.

TABLE 3

| User | Chat (number of times) | Time (day) | Comment (number of times) |
| --- | --- | --- | --- |
| User 1 | 10 | 100 days | 10 times |
| User 2 | 1 | 10 days | 2 times |
| User 3 | 40 | 200 days | 20 times |
| User 4 | 100 | 100 days | 20 times |

In the determining manner 2, user identities of the other users are obtained, a position opposite to the user is determined as a display position of a user with the highest user identity in the other users, and display positions of remaining users in the other users are determined randomly.

To highlight the leading function of some users in the group video session, the server may determine the display position according to the user identity. The user identity is used for indicating a degree of importance of the user in the current group video session. Standards for measuring user identities are not limited in the embodiments of the present disclosure. For example, if a user A in the other users is a user initiating the group video session, it indicates that the user A may lead the current group video session. Therefore, the user A is determined as a user with the highest identity. For another example, if a user B in the other users is an administrator in a group corresponding to the group video session, the user B may also be determined as the user with the highest identity.

In the determining manner 3, display positions of the other users are arranged starting from any side of the user according to a time sequence in which the other users join the group video session To make the display position determining process more convenient and save computing resources of the server, the display positions may be determined directly according to a time point when the user joins the group video session. Generally, the user confirms whether to join the group video session. Therefore, when detecting an operation of confirming joining the group video session performed by a user, a user equipment may send a joining confirmation message to the server. When receiving the first joining confirmation message in the group video session, the server may arrange the user corresponding to the joining confirmation message at a display position closest to the user, and sequentially arrange display positions of users corresponding to subsequently received joining confirmation messages.

In the determining manner 4, according to a position selected by the user in the virtual environment, the position selected by the user is determined as a display position of the user in the virtual environment.

To make the display position determining process more user-friendly, the server also supports users to select display positions on their own. In this determining manner, the server may provide a virtual environment template for each user before the group video session begins, and each user selects a display position on the virtual environment template. Definitely, to avoid conflicts when the users select display positions, the server should display selected display positions at present in real time. For example, when a display position is selected, the server may add an unavailability tag to the display position, so that each user selects a display position in available display positions.

In the determining manner 5, a position opposite to the user is determined as a display position of a common user, and display positions of remaining users in the other users are randomly determined.

Considering that a common user is generally displayed in a form of a two-dimensional character, in the three-dimensional virtual environment, to prevent two-dimensional video data corresponding to the common user from being distorted and to display the image of the common user as complete as possible, the server may determine a position opposite to the user as a display position of the common user, and randomly determine display positions of remaining users.

It should be noted that, each user should correspond to one display area. Therefore, when a user A selects a display position, the server determines a display area corresponding to the user A. Moreover, to make the spacing more uniform when the users are displayed in the virtual environment, the server may divide display areas in the virtual environment in advance. For example, for a round-table conference virtual environment, each seat corresponds to one display area.

Definitely, any two or more determining manners of the foregoing five determining manners may also be combined.

For example, the determining manner 4 is combined with the determining manner 5. The server first determines a position opposite to the user as a display position of a common user, and provides a virtual environment template for each virtual user. Moreover, on the virtual environment template, there is already an unavailability tag at the display position determined for the common user, so that each virtual user can select one display position from available display positions.

203F: For each common user in the group video session, the server generates/obtains specified video data of the common user designated for the display position corresponding to the common user (e.g., to be integrated/synthesized to the target video at specific location and/or time).

The specified video data refers to video data that is obtained based on received video data of the common user and that meets the VR display mode. In this step, the common user includes a first common user and a second common user, where the first common user refers to a common user using a stereo camera, and the second common user refers to a common user using a monocular camera. The two common users have different video data. Therefore, the server also obtains the specified video data in different manners. A case 1 and a case 2 are illustrated in one embodiment of the present disclosure.

In the case 1, if the common user includes a first common user, two streams of two-dimensional video data of the first common user are converted into first three-dimensional video data, and the first three-dimensional video data is used as the specified video data; alternatively, if the common user includes the first common user, the two streams of two-dimensional video data of the first common user are used as the specified video data.

In this case, to display the first common user in a form of a three-dimensional character in the virtual environment, the server may obtain the specified video data in two manners:

In the first manner, the two streams of two-dimensional video data are converted into the first three-dimensional video data. Because the two streams of two-dimensional video data correspond to an actual scenario of the common user captured from two visual angles respectively, by using a pixel in one stream of two-dimensional video data as reference, a pixel corresponding thereto is determined in the other stream of two-dimensional video. The two pixels correspond to the same position in the actual scenario, and therefore, parallax of the two pixels is determined. After the foregoing processing is performed on all the pixels in the two streams of two-dimensional video data, a parallax map can be obtained. Three-dimensional image data of the actual scenario is constructed according to the parallax map.

In the second manner, the two streams of two-dimensional video data are directly used as the specified video data. When the specified video data is sent to a VR device, a specified display instruction may also be sent. The specified display instruction is used for instructing the VR device to render the two streams of two-dimensional video data in a left-eye screen and a right-eye screen respectively. By rendering the two streams of two-dimensional video data from different visual angles in the left-eye screen and the right-eye screen respectively, parallax can be formed during display, thereby achieving a three-dimensional display effect.

In the case 2, if the common user includes a second common user, two-dimensional video data of the second common user is used as the specified video data.

It should be noted that, the manner for determining the user type of the common user is not limited in the embodiments of the present disclosure. For example, if the user receives two streams of two-dimensional video data from a common user at the same time, it can be determined that the user type of the common user is first common user; otherwise, it can be determined that the common user is a second common user.

Based on the display position determined in step 203E and the specified video data obtained in step 202F, the server may synthesize the specified video data to the display position corresponding to the common user. Definitely, to make the display effect more real, before synthesis, the server may adjust, according to a preset synthesis size, a display size corresponding to the specified video data to the synthesis size. The synthesis size may be determined according to a ratio of a virtual environment to a real character, and each virtual environment may correspond to one synthesis size.

Figure 4:
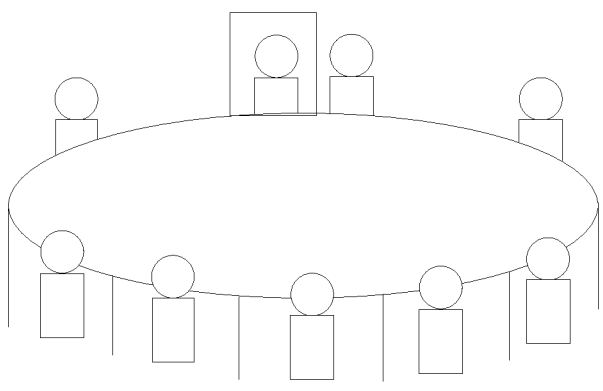
FIG. 4 is a schematic diagram of a group video session scenario according to an embodiment of the present disclosure.
Figure 4:
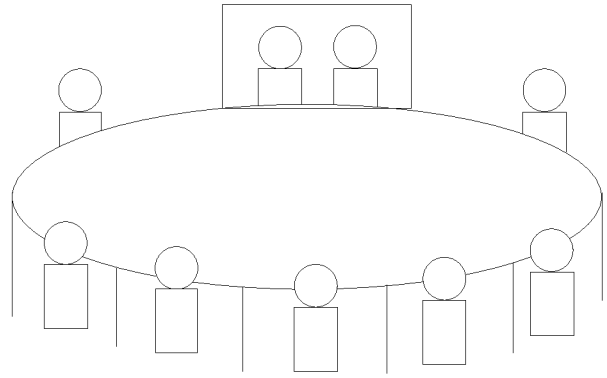

It should be noted that, because the specified video data is merely video data from one visual angle (for the second common user) or two visual angles (for the first common user), during synthesis, the specified video data only occupies two-dimensional spatial positions in the virtual environment. Moreover, each common user has a different display position. To provide a better display effect for the user, the server may add a frame to layer edges of the specified video data during synthesis, so that the specified video data has a display effect of being rendered on a "virtual screen" in the virtual environment. Definitely, if display positions in two or more pieces of specified video data are adjacent, the server may also add frames to layer edges of these pieces of specified video data, so that two or more common users can be displayed in the same "virtual screen". Referring to FIG. 4, an embodiment of the present disclosure provides a schematic diagram of a group video session scenario. As shown in FIG. 4(a), one common user is displayed in one "virtual screen"; as shown in FIG. 4(b), two common users are displayed in one "virtual screen".

203G: For each virtual user in the group video session, the server obtains a three-dimensional virtual character and audio data of the virtual user designated for the display position corresponding to the virtual user (e.g., to be integrated/synthesized to the target video at specific location and/or time).

In this step, the server may obtain a three-dimensional virtual character of the virtual user (an obtaining process is similar to step 203A), adjust the three-dimensional virtual character to a synthesis size, synthesize the adjusted three-dimensional virtual character to the display position corresponding to the virtual user, and synthesize the synthesized three-dimensional image data with the obtained audio data of the virtual user, to obtain audio-video data of the virtual user.

203H: The server uses synthesized video data as the target video data of the user. In some embodiments, the server obtains the target video data of the user by integrating the specified video data of at least one common user and the three-dimensional virtual character and the audio data of at least one virtual user based on the corresponding display positions.

Through the synthesis processes of steps 203F and 203G, the server can finally obtain the target video data. The target video data includes a virtual character corresponding to each virtual user and video data of each common user in the group video session.

204: The server sends the target video data to a user equipment of the user during the group video session, so that the user performs the group video session (i.e., the user equipment presents the target video data of the group video session in the video display mode indicated by the user type of the user).

Figure 5:
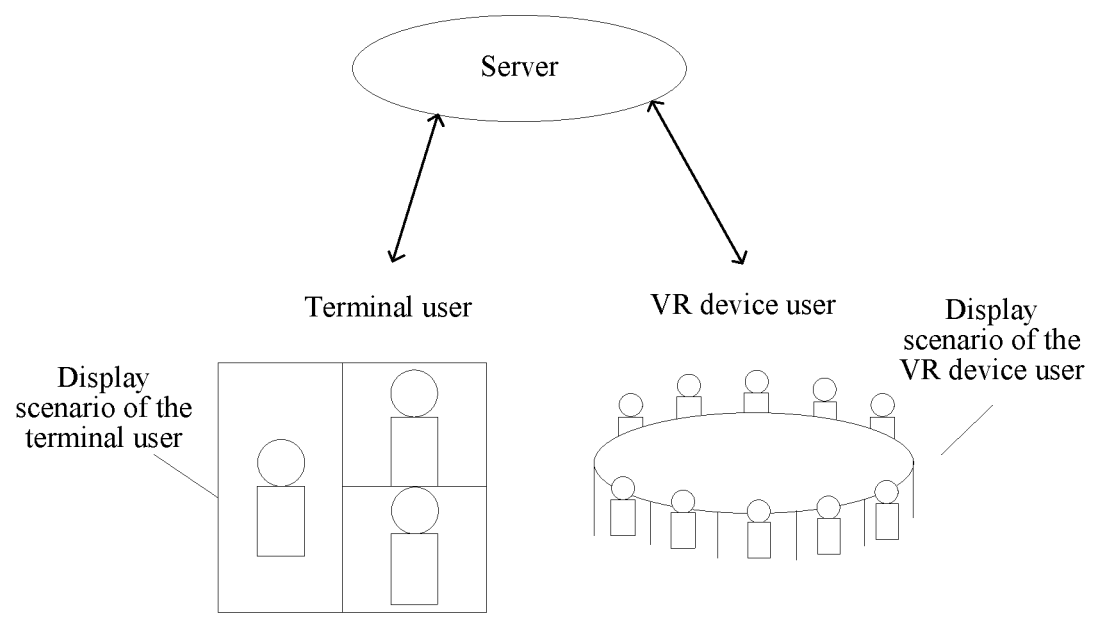
FIG. 5 is a schematic diagram of a display scenario according to an embodiment of the present disclosure.

For each user in the group video session, if the user type of the user is common user, the server may send the target video data obtained through steps 203A-203C to the terminal of the user. If the user type of the user is virtual user, the server may send the target video data obtained through steps 203D-203H to the VR device of the user, so that each user can perform the group video session. Referring to FIG. 5, an embodiment of the present disclosure provides a schematic diagram of a display scenario. A user logging into the server by using a terminal is referred to as a terminal user, and a user logging into the server by using a VR device is referred to as a VR device user.

Figure 6:
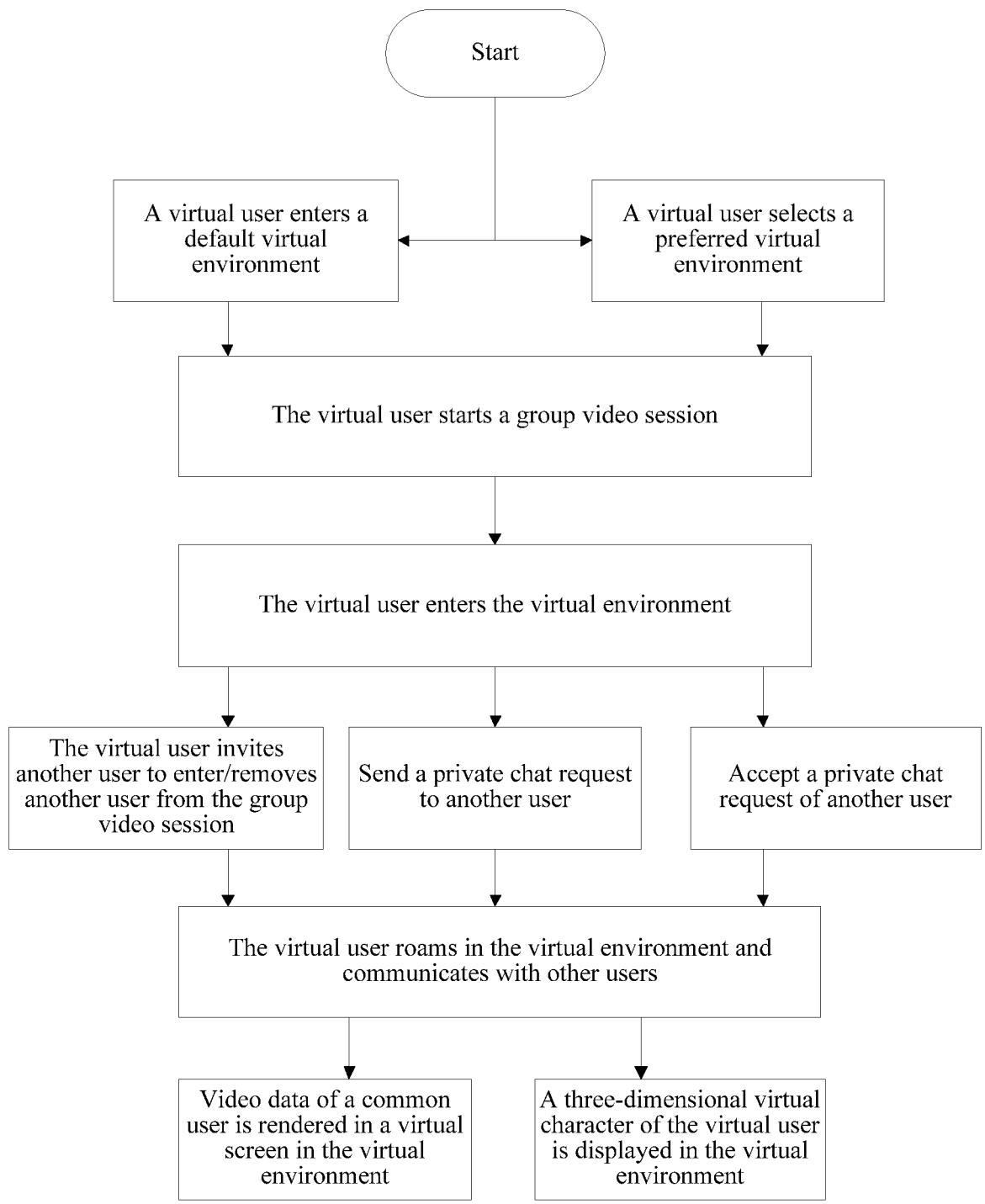
FIG. 6 is a flowchart of performing a group video session by a virtual user according to an embodiment of the present disclosure.

It should be noted that, during the group video session, some users may also have a specified management right. The specified management right refers to a right to invite or remove a user during the group video session. Specific users having the specified management right are not limited in the embodiments of the present disclosure. For example, the server may open the specified management right to a user initiating the group video session. As shown in FIG. 6, an embodiment of the present disclosure provides a flowchart of performing a group video session by a virtual user. The virtual user may invite another user out of the group video session to join the group video session, or remove a user from the group video session, or send a private chat request to another user, or accept a private chat request of another user.

205: When receiving the target video data of the group video session sent by the server, a terminal displays the target video data, so that each common user in the group video session is displayed in a form of a two-dimensional character, and each virtual user in the group video session is displayed in a form of a two-dimensional virtual character.

The user type of the terminal user is common user. Therefore, the terminal user uses the two-dimensional display mode when participating in the group video session.

The two-dimensional video data of each user has been synthesized on the server side according to the display position and the display size. Therefore, when receiving the target video data, the terminal may render the target video data on a screen, so that a two-dimensional character of a common user or a two-dimensional virtual character corresponding to a virtual user is displayed in each area on the screen.

206: When receiving the target video data of the group video session sent by the server, a VR device displays the target video data, so that each common user in the group video session is displayed in a form of a two-dimensional character or a three-dimensional character in a virtual environment, and each virtual user in the group video session is displayed in a form of a three-dimensional virtual character in the virtual environment.

The user type of the VR device user is virtual user. Therefore, the VR device user uses the VR display mode when participating in the group video session.

Because the two-dimensional video data or the three-dimensional video data of the common user and the three-dimensional virtual character corresponding to the virtual user are already synthesized on the server side according to the display positions, when the VR device receives the target video data, the target video data can be rendered in the left-eye screen and the right-eye screen of the VR device, so that the VR device can display the two-dimensional character or the three-dimensional character of the common user at the display position corresponding to the common user, and display the three-dimensional virtual character of the virtual user at the display position corresponding to the virtual user.

In addition, to clearly inform the VR device user of a user who is currently speaking, if the VR device detects, based on the target video data, that any user in the group video session is speaking, a speaking prompt is displayed at the display position corresponding to the user. An expression form of the speaking prompt is not limited to a text prompt "speaking", an arrow icon, a flickering icon, or the like. The manner for detecting whether a user is speaking is not limited in the embodiments of the present disclosure. For example, when detecting audio data of the user from the current target video data, the VR device determines that the user is speaking, further determines the display position corresponding to the user, and display a speaking prompt at the display position thereof.

In some embodiments of the present disclosure, a user type of each user in a group video session is determined, and video data of the group video session is processed according to the user type, so that when the user type is virtual user, target video data matching with a VR display mode indicated by the virtual user can be obtained, and when the user type is common user, target video data matching with a two-dimensional display mode indicated by the common user can be obtained. Therefore, proper display modes are used to display video data for users of different types, so that a group video session can be performed between users of different types without restrictions, thereby improving the flexibility of the group video session.

In addition, when the user type of the user is common user, a three-dimensional virtual character corresponding to each virtual user in the group video session is converted into a two-dimensional virtual character, and the two-dimensional virtual character is synthesized with a two-dimensional background and audio data, to obtain two-dimensional video data of the virtual user, so that the two-dimensional video data of the virtual user matches with the two-dimensional display mode corresponding to the user, thereby providing the user with a specific manner for processing video data of the virtual user in the group video session.

In addition, when the user type of the user is virtual user, a display position of each user of the group video session in a virtual environment can be determined, two-dimensional video data of each common user and a three-dimensional virtual character of the virtual user are synthesized to corresponding display positions respectively, so that synthesized video data matches with the VR display mode corresponding to the user, thereby providing the user with a specific manner for processing video data of the virtual user in the group video session.

In addition, for a first common user and a second common user, different manners for obtaining specified video data are provided: processing two streams of two-dimensional video data of the first common user into first three-dimensional video data, or directly obtaining the two streams of two-dimensional video data as the specified video data, and informing a VR device of a display mode; and using two-dimensional video data of the second common user as the specified video data. Through the two different obtaining manners, display effects corresponding to the user types of the common user can be provided intelligently.

In addition, at least three specific methods for determining a virtual environment corresponding to the group video session are provided. It is possible to support a user to select a virtual environment. Alternatively, according to the quantity of users in the group video session, a virtual environment with a capacity matching with the quantity of users may be selected. Further, virtual environments that have been selected by each user may be analyzed, and a virtual environment selected for the largest number of times is selected. Therefore, manners for determining a virtual environment are diversified.

In addition, at least five determining manners are provided, so as to determine a display position of each user in the virtual environment: the server intelligently selects a seat for each user according to a degree of intimacy between users, a user identity, or a time point when the user joins the group video session; or in a more user-friendly manner, the user selects a display position; or to display an image of a common user as complete as possible, a display position of the common user is arranged opposite to a front visual angle of the user.

Figure 7:
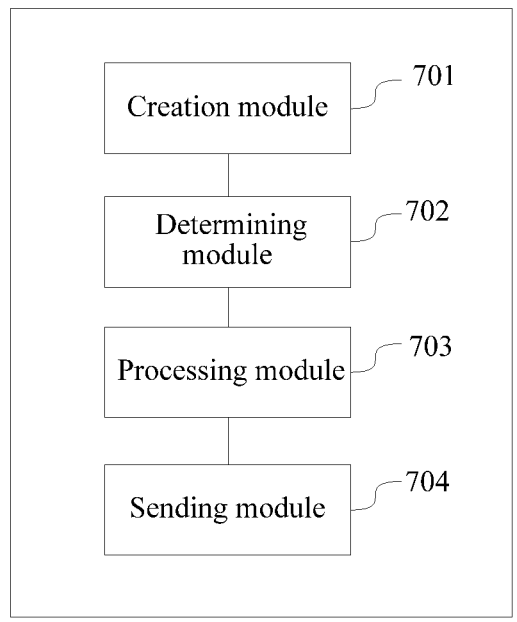
FIG. 7 is a block diagram of a group video session apparatus according to an embodiment of the present disclosure.

FIG. 7 is a block diagram of a group video session apparatus according to an embodiment of the present disclosure. Referring to FIG. 7, the apparatus specifically includes:

a creation module 701, configured to create a group video session;

a determining module 702, configured to determine, for each user in the group video session, a user type of the user according to device information of the user, the user type including common user and virtual user, the common user being used for indicating that the user uses a two-dimensional display mode when participating in the group video session, and the virtual user being used for indicating that the user uses a VR display mode when participating in the group video session;

a processing module 703, configured to process video data of the group video session according to a video display mode indicated by the user type of the user, to obtain target video data of the user, a video display mode of the target video data matching with the video display mode indicated by the user type of the user; and a sending module 704, configured to send the target video data to a user equipment of the user during the group video session, so that the user performs the group video session.

In some embodiments of the present disclosure, a user type of each user in a group video session is determined, and video data of the group video session is processed according to the user type, so that when the user type is virtual user, target video data matching with a VR display mode indicated by the virtual user can be obtained, and when the user type is common user, target video data matching with a two-dimensional display mode indicated by the common user can be obtained. Therefore, proper display modes are used to display video data for users of different types, so that a group video session can be performed between users of different types without restrictions, thereby improving the flexibility of the group video session.

In a possible implementation, the processing module 703 is configured to: convert a three-dimensional virtual character corresponding to each virtual user in the group video session into a two-dimensional virtual character if the user type of the user is common user; synthesize the two-dimensional virtual character, a two-dimensional background selected by the virtual user, and audio data corresponding to the virtual user, to obtain first two-dimensional video data; and synthesize the first two-dimensional video data of at least one virtual user and the second two-dimensional video data of at least one common user, to obtain the target video data of the user, the second two-dimensional video data referring to two-dimensional video data of a common user in the group video session.

In a possible implementation, the processing module 703 is configured to: determine a virtual environment corresponding to the group video session if the user type of the user is virtual user; determine a display position of each user of the group video session in the virtual environment by using the virtual environment as a three-dimensional background; synthesize, for each common user in the group video session, specified video data of the common user to the display position corresponding to the common user; synthesize, for each virtual user in the group video session, a three-dimensional virtual character and audio data of the virtual user to the display position corresponding to the virtual user; and use synthesized video data as the target video data of the user.

In a possible implementation, the processing module 703 is further configured to: convert, if the common user includes a first common user, two streams of two-dimensional video data of the first common user into first three-dimensional video data, and use the first three-dimensional video data as the specified video data, the first common user referring to a common user using a stereo camera, or use the two streams of two-dimensional video data of the first common user as the specified video data if the common user includes the first common user; and use, if the common user includes a second common user, two-dimensional video data of the second common user as the specified video data, the second common user referring to a common user using a monocular camera.

In a possible implementation, the processing module 703 is configured to determine a virtual environment corresponding to a virtual environment option triggered by the user as the virtual environment corresponding to the user in the group video session; or the processing module 703 is configured to determine a virtual environment capacity corresponding to the group video session according to a quantity of users in the group video session, and determine a virtual environment meeting the capacity as the virtual environment corresponding to the group video session; or the processing module 703 is configured to analyze virtual environments that have been selected by each user in the group video session, to obtain the number of times that each virtual environment is selected, and determine a virtual environment selected for the largest number of times as the virtual environment corresponding to the group video session.

In a possible implementation, processing module 703 analyze, according to social data between the user and other users in the group video session, degrees of intimacy between the user and the other users, and arrange display positions of the other users starting from any side of the user in descending order of the degrees of intimacy; or the processing module 703 is configured to obtain user identities of the other users, determine a position opposite to the user as a display position of a user with the highest user identity in the other users, and randomly determine display positions of remaining users in the other users; or the processing module 703 is configured to arrange display positions of the other users starting from any side of the user according to a time sequence in which the other users join the group video session; or the processing module 703 is configured to determine, according to a position selected by the user in the virtual environment, the position selected by the user as a display position of the user in the virtual environment; or the processing module 703 is configured to determine a position opposite to the user as a display position of the common user, and randomly determine display positions of remaining users in the other users.

All the optional technical solutions above can be combined in any manner to form optional embodiments of the present disclosure, which are not elaborated herein.

Figure 8:
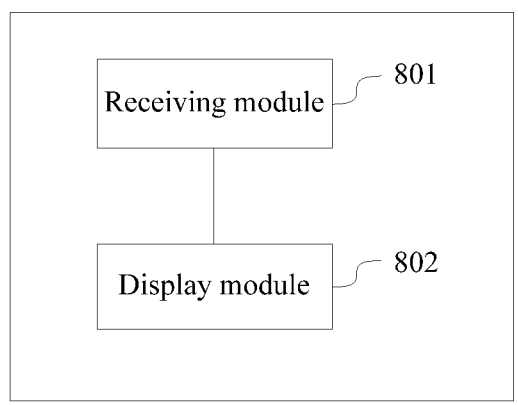
FIG. 8 is a block diagram of a group video session apparatus according to an embodiment of the present disclosure.

FIG. 8 is a block diagram of a group video session apparatus according to an embodiment of the present disclosure. Referring to FIG. 8, the apparatus specifically includes:

a receiving module 801, configured to receive target video data of a group video session sent by a server, a video display mode of the target video data matching with a video display mode indicated by a user type of a terminal user, the user type of the terminal user being common user, and the common user being used for indicating that the terminal user uses a two-dimensional display mode when participating in the group video session; and a display module 802, configured to display the target video data, so that each common user in the group video session is displayed in a form of a two-dimensional character, and each virtual user in the group video session is displayed in a form of a two-dimensional virtual character.

In some embodiments of the present disclosure, target video data is received, and because the target video data is obtained through processing by a server according to a user type, the target video data matches with a two-dimensional display mode indicated by a common user. In this way, a terminal user is provided with a proper display mode to display video data. Therefore, a group video session can be performed between users of different types freely, thereby improving the flexibility of the group video session.

Figure 9:
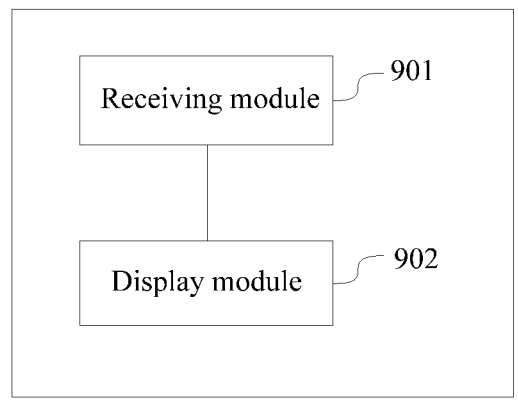
FIG. 9 is a block diagram of a group video session apparatus according to an embodiment of the present disclosure.

FIG. 9 is a block diagram of a group video session apparatus according to an embodiment of the present disclosure. Referring to FIG. 9, the apparatus specifically includes:

a receiving module 901, configured to receive target video data of a group video session sent by a server, a video display mode of the target video data matching with a video display mode indicated by a user type of a VR device user, the user type of the VR device user being virtual user, and the virtual user being used for indicating that the VR device user uses a VR display mode when participating in the group video session; and a display module 902, configured to display the target video data, so that each common user in the group video session is displayed in a form of a two-dimensional character or a three-dimensional character in a virtual environment, and each virtual user in the group video session is displayed in a form of a three-dimensional virtual character in the virtual environment.

In some embodiments of the present disclosure, target video data is received, and because the target video data is obtained through processing by a server according to a user type, the target video data matches with a two-dimensional display mode indicated by a virtual user. In this way, a VR device user is provided with a proper display mode to display video data. Therefore, a group video session can be performed between users of different types freely, thereby improving the flexibility of the group video session.

In a possible implementation, the display module 902 is configured to: display, at a display position corresponding to the common user, the two-dimensional character or the three-dimensional character of the common user; and display, at a display position corresponding to the virtual user, the three-dimensional virtual character corresponding to the virtual user.

In a possible implementation, the display module 902 is further configured to display, if it is detected based on the target video data that any user in the group video session is speaking, a speaking prompt at a display position corresponding to the user.

All the optional technical solutions above can be combined in any manner to form optional embodiments of the present disclosure, which are not elaborated herein.

It should be noted that, when the group video session apparatus provided in the foregoing embodiment performs a group video session, the foregoing division of the functional modules is merely used as an example for description. In actual application, the foregoing functions may be completed by different functional modules as required. That is, the internal structure of the apparatus may be divided into different functional modules to complete all or some of the functions described above. In addition, the group video session apparatus provided in the foregoing embodiment belongs to the same conception as the embodiment of the group video communication method. For a specific implementation process of the apparatus, refer to the method embodiment; details are not described herein again.

Further, during the group video session, the actual appearance of each virtual user has a respective feature. However, virtual characters provided on a VR device are limited, and may be significantly different from the actual appearance of the virtual user, resulting in a poor effect of expressing the virtual user by using a virtual character, and a poor visual effect during the group video session. Therefore, some embodiments further provides a session method that better conforms to an actual appearance and an actual movement of a user, so as to enhance the visual effect during the group video session. This process may be performed in the process of processing video data during the group video session to obtain target video data of the user in the foregoing embodiment, or may be performed when video data of the user is generated on the VR device or when the video data is synthesized, which is not limited in the embodiments of the present disclosure.

Figure 10:
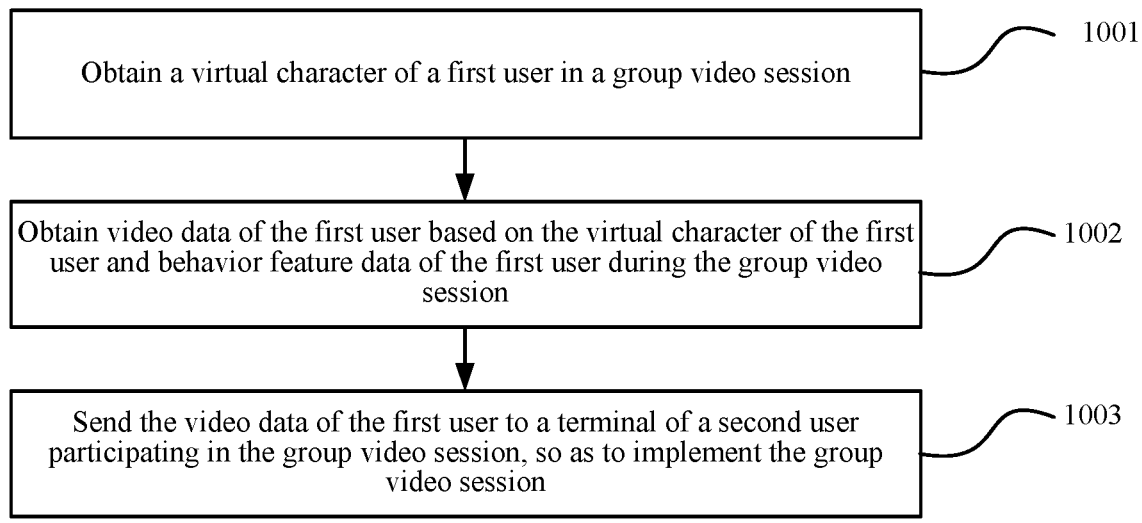
FIG. 10 is a flowchart of a group video communication method according to an embodiment of the present disclosure.

FIG. 10 is a flowchart of a group video communication method according to an embodiment of the present disclosure. Referring to FIG. 10, the method may be applied to a server or a VR device. For example, when performed by a server, the method specifically includes the following steps:

1001: A server obtains a virtual character of a first user in a group video session.

The group video session refers to a video session performed by a plurality of (two or more) users based on the server. The plurality of users may be a plurality of users on a social platform corresponding to the server, and the plurality of users may have a group relationship or a friendship. It should be noted that, a user in the group video session may be a virtual user using a VR device or a conventional user using a conventional terminal (such as a desktop computer or a mobile phone).

The first user may be any user in the group video session (e.g., a common user or a virtual user). The virtual character of the first user is obtained at least according to head feature data of the first user and a body model corresponding to the first user. Time for obtaining the virtual character is not limited in the embodiments of the present disclosure. For example, when the server creates a group video session for a plurality of users, a virtual character of each user of the plurality of users is obtained. For another example, during the group video session, the first user accepts an invitation from a user in the group video session, so that the server obtains the virtual character of the first user when determining that the first user joins the group video session.

In some embodiments of the present disclosure, the server may create a virtual character for the first user in real time according to head feature data and a corresponding body model of the first user, thereby obtaining the virtual character. Alternatively, the virtual character of the first user may be pre-stored in a virtual character database configured on the server. Therefore, the server may also query, according to a user identifier of the first user, whether a virtual character corresponding to the user identifier exists in the virtual character database; if yes, the virtual character of the first user can be directly obtained; otherwise, a virtual character can be created for the first user in real time. In fact, the virtual character pre-stored in the virtual character database is also created by the server in advance. That is, the virtual character obtaining process includes the creation process. The virtual character obtaining process based on the creation process may be performed by using the following steps 1001A-1001D:

1001A: The server obtains head feature data of the first user.

The head feature data is used for describing an actual head appearance of the first user, and can be used for indicating at least one of the following items of the first user: a hair area, a hair color, a face area, a face color, facial features positions, and facial features forms. The facial features forms at least include facial features colors and facial features profiles.

The manner for obtaining the head feature data is not limited in the embodiments of the present disclosure. For example:

The server obtains head image data of the first user, and analyzes a color distribution of the head image data to obtain the head feature data. The head image data may come from multiple sources, for example, head image data (a mug shot) in a cloud photo album of the first user, or head image data captured by a camera of the first user currently. Definitely, the server may also obtain a plurality of head images of the first user, thereby analyzing the head image data more comprehensively. In fact, the server may also provide a photographing prompt. The photographing prompt is used for prompting a user to take photos from different shooting angles, so that the server can obtain head image data from different shooting angles. Therefore, a subsequently obtained head model better matches with the actual appearance of the first user.

Because colors of the hair, face and facial features of the user have respective features (for example, a yellow man generally has black hair, a yellow face, eyes in black and white, and a red mouth), and the brightness of the colors is also different (for example, the mouth, the bridge of the nose, the forehead and other relatively protruding parts are generally brighter, while the wing of the nose and the eye sockets are generally darker). Therefore, the server may obtain the head feature data based on the foregoing features.

When determining the face color and face area, the server may compare color values of pixels in the head image data with a plurality of configured skin colors. If color values of a continuous pixels exceeding a first ratio all match with a skin color, the skin color can be determined as the face color, and an image area formed by the continuous pixels matching with the color is determined as the face area.

When determining the hair color and the hair area, the server may determine continuous pixels adjacent to the face area as the hair area, and extract a color value of the continuous pixels as the hair color.

When determining the facial features positions, because colors of the mouth, the eyes and the eyebrows are all different from the face color, the server may determine hollow areas in the face area as positions of the mouth, the eyes, and the eyebrows respectively. The eyebrows are located at the top, the eyes are in the middle, and the mouth is located at the bottom. Moreover, because the ears protrude externally with respect to the face, the server may determine edge pixels on two sides of the face area, and analyze slopes of tangents of the edge pixels. If change rates of slopes of tangents from a pixel A to a pixel B all meet a preset change rate, an area where the pixel A to the pixel B are located may be determined as an ear position. In addition, because the nose stands out from the face, shadows are generally formed on two sides of and under the nose. Therefore, the server can perform analysis to obtain continuous pixels having an intensity higher than a first intensity in the face area, and the intensity of continuous pixels on two sides of and under the continuous pixels is lower than a second intensity. An area where the three parts of continuous pixels are located is determined as a nose position. According to the facial feature positions determined above, the server can determine shapes formed by edge pixels of the facial features positions as facial features profiles, and determine colors of the pixels of the facial features positions as the facial feature colors, thereby obtaining the facial features forms. Definitely, to express a stereo degree of the nose, the server may record an intensity ratio of pixels higher than the first intensity to pixels lower than the second intensity in the nose position. A higher intensity ratio represents that the nose of the first user is more stereo.

In fact, the foregoing manner for obtaining the head feature data is merely an example. Any manner for obtaining the head feature data may be used in the embodiments of the present disclosure, such as a recognition algorithm based on a face template or a recognition algorithm using a neural network.

Definitely, the server may further continue to correct the determined head feature data. For example, the server determines a facial features proportion according to the facial features positions in the head feature data, compares the facial features proportion with a configured normal facial features proportion. If the facial features proportion does not conform to the normal facial features proportion, the server may adaptively correct the position of a part of the facial features, so that the facial features proportion conforms to the facial features proportion. In fact, the normal facial features proportion is used for indicating a range of normal facial features proportions. Therefore, in the comparison process, the facial features proportion only needs to conform to the range of normal facial features proportions.

It should be noted that, to save computing resources of the server, the server may also analyze necessary head feature data. The necessary head feature data is used for briefly describing the actual head appearance of the first user. For example, the necessary head feature data may be used for indicating the face color, the facial features positions, and the facial features forms.

1001B: The server generates a head model matching with the head feature data according to the head feature data.

Based on the head feature data obtained in step 1001A, to express a head model of a virtual character in further detail so that the head model better matches with the actual appearance of the first user, this step may specifically include: determining a head profile model according to the face area and the hair area, where the head profile model includes a face profile model and a hair profile model; filling the face profile model and the hair profile model according to the face color and the hair color; obtaining facial features models matching with the facial features forms; synthesizing the facial features models to the face profile model according to facial features positions, and generating the head model matching with the head feature data.

For example, if the server determines that the face color is a milk white color and the hair color is a brown color, the server can determine a face profile (hair profile) according to a shape formed by edge pixels of the face area (hair area), so as to generate the face profile model (hair profile model), thereby determining the head profile model. Further, the server fills the face profile model with the milk white color to obtain the face model, and fills the hair profile model with the brown color to obtain the hair model. Further, the server can compare the facial features forms, such as a nose form and a mouth form, with cartoon facial features models in a facial features model database, to obtain facial features models most similar to the facial features colors and the facial features profiles, synthesize the obtained facial features models to the filled face profile model according to the facial features positions respectively, and create a three-dimensional head model according to the radians of the face profile model and the hair profile model, so that the generated head model matches with the actual head appearance of the first user.

In fact, the server may also generate cartoon facial features models according to the facial feature forms. For example, a mouth profile is filled with a mouth color in a mouth form, and pixels on lines connecting two ends of the mouth profile are made darker, to generate a mouth model. Moreover, the mouth model presents a "two-lip" effect. For example, an eye form includes at least two eye colors, that is, an eyeball color and an eye-white color. The eye-white color is generally the white color. Therefore, the server can fill the eye profile with the white color in the eye colors, and fill a spherical profile in the eye profile with the other one of the eye colors. The spherical profile is tangent to the eye profile.

It should be noted that, to express the head appearance of the first user in further detail, the server may further process the head model. For example, the server adds a texture to the hair model, obtains age data of the first use, and adds a texture matching with the age of the first user to the face model. For another example, the server obtains gender data of the first user, and if the first user is a female, the length of eyelashes on the eye model can be increased, and the brightness of the mouth model can be enhanced. For another example, the server obtains occupation data of the first user, and if the first user is a student, a glass model can be added to the face model.

1001C: The server determines a body model corresponding to the first user according to a user attribute of the first user.

The user attribute is not limited to the gender, age, and occupation of the user. Generally, the user fills in the user attributes when registering an account on a social platform, so that the server can obtain the user attribute, and store the user attribute and the user identifier in a corresponding manner.

The actual appearance of the user is generally closely related to user attributes such as the gender, age, occupation, height, weight. Therefore, to make the virtual character better conform to the actual appearance of the first user, the server may obtain, according to a user identifier of the first user, a user attribute corresponding to the user identifier, and then select, from a body model database according to the user attribute, a body model matching with the user attribute. Moreover, the server also provides dress models.

A dress providing manner is not limited in the embodiments of the present disclosure. For example, the body model may include dress, or the server may provide dress models separately, where the dress models may be stored in the body model database or stored in a dress model database configured on the server. If the server provides the dress models separately, the dress models and corresponding dress options can be provided for the first user, so that the first user can select a corresponding dress model through the dress option. Alternatively, the server may also obtain image data of the first user, determine clothes that the first user wears in the image data, obtain a dress model matching with the clothes that the first user wears, and provide the dress model for the first user. Matching with dress models is not limited to matching in accordance with the color or shape of the clothes. Alternatively, the server may determine the dress model of the first user according to the user attribute, and a specific process is similar to the following process of determining a body model.

In addition, if the body model includes the dress model, the server may also determine the body model by using at least three user attributes as follows:

(1). Determine a Body Model Matching with Gender Data of the First User According to the Gender Data of the First User.

Generally, a male has a stronger figure, and a female has a smaller figure. Therefore, in view of characteristics of the male and female figures, the body model database may provide various special body models for males or females, and each body model corresponds to a gender label, so that the user can determine, according to the gender label, a body model matching with the gender data of the first user. Moreover, dress in the body model with a male label may be pants, and dress in the body model with a female label may be a skirt.

(2). Determine a Body Model Matching with Age Data of the First User According to the Age Data of the First User Generally, the older a user is, the more mature the clothing style of the user becomes. Therefore, the body model database may provide body models with various clothing styles according to age groups to which users belong, where each body model corresponds to an age group label. For example, a body model in which a comic character appears on the dress corresponds to an age group label of under 18. Therefore, the user or the server can determine, according to the age group label, a body model matching with the age data of the first user.

(3). Determine a Body Model Matching with Occupation Data of the First User According to the Occupation Data of the First User.

In real life, users with different occupations have different business wears. Therefore, the body model database may also provide various body models wearing business wears, where each body model corresponds to an occupation label. For example, an occupation label corresponding to a business suit body model is white collar, and an occupation label corresponding to a school uniform body model is student. Therefore, the user or the server can determine, according to the occupation label, a body model matching with the occupation data of the first user.

It should be noted that, the form of the label corresponding to each body model is not limited in the embodiments of the present disclosure. For example, each body model may correspond to at least two of the foregoing labels, or a label corresponding to each body model has two meanings. For example, the label is a female teacher label. Once the body model corresponds to at least two labels or the corresponding label has two or more meanings, the server can determine the body model corresponding to the first user according to at least two user attributes. For example, if the server determines that the first user is a female doctor according to the gender data and the occupation data of the first user, the server may search the body model database for a body model with a gender label being female and an occupation label being doctor, or a body model with a label being female doctor, and determine the found body model as the body model corresponding to the first user.

It should be noted that, when determining the body model, in addition to the user attribute, other factors may also be considered, such as a group type corresponding to the group video session, a virtual environment in the group video session, and a current actual temperature. The group type refers to a group type of a group to which the plurality of users in the group video session belongs. The following describes specific manners for determining the body model with reference to the foregoing three types of data.

In a determining manner 1, the server determines a group type of a group to which the plurality of users in the group video session belongs, and determines a body model matching with the group type as the body model of the first user. For example, each body model corresponds to a group type label, and a business suit body model may correspond to a company group label. Therefore, when the group type is company group, the server can find the business suit body model corresponding to the company group label, and determine the business suit body model as the body model of the first user.

In a determining manner 2, the server determines a virtual environment type corresponding to the group video session, and determines a body model matching with the virtual environment type as the body model of the first user. For example, if the virtual environment type is beach, the server can determine a beach wear body model as the body model corresponding to the first user.

In a determining manner 3, the server obtains a current actual temperature, and determines a body model matching with the current actual temperature as the body model of the first user. For example, when the current actual temperature is 35 degrees, the server can determine a summer wear body model as the body model corresponding to the first user.

In fact, when determining the body model of the first user, the server may also provide an adjustment option for the first user. The adjustment option and the adjustment option providing manner are not limited in the embodiments of the present disclosure. For example, after determining an initial body model of the first user, the server provides the initial body model and the adjustment option for the first user. The adjustment option includes a height adjustment option, a body shape adjustment option, and a dress adjustment option. The first user can adjust the height by triggering the height adjustment option, adjust the size of the body shape by triggering the body shape adjustment option, and changes the dress by triggering the dress adjustment option.

It should be noted that, step 1001C is an optional step of some embodiments of the present disclosure. In fact, because the head model can express the actual appearance of the first user sufficiently, it is also possible to randomly select a body model matching with the gender data from the body model database according to the gender data of the first user, so as to simplify the implementation process and reduce computing resources of the server.

In addition, it should be noted that, the sequence of steps 1001A and 1001C is not limited in the embodiments of the present disclosure. In fact, the server may also determine the body model first, or the server may determine the head model and the body model simultaneously.

1001D: The server synthesizes the head model with the body model, to obtain a virtual character of the first user.

Figure 11:
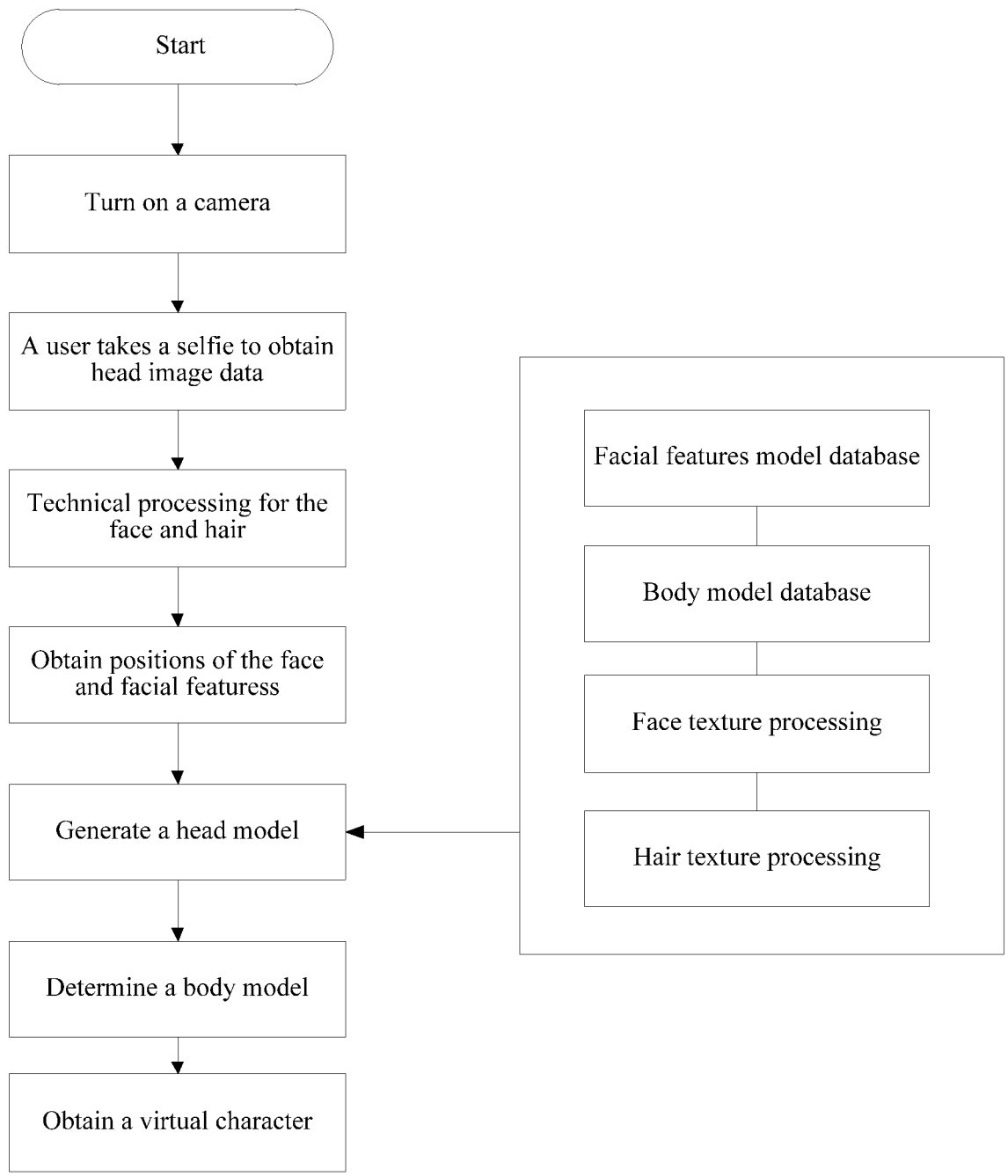
FIG. 11 is a flowchart of obtaining a virtual character according to an embodiment of the present disclosure.

Through step 1001, the server obtains the head image data of the user, performs technical processing on the face and hair to obtain the positions of the face and facial features, generates the head model according to the facial features model data, the body model database, and the like, and synthesizes the head model to an upper portion of the body model, thereby obtaining a complete virtual character. Referring to FIG. 11, an embodiment of the present disclosure provides a flowchart of obtaining a virtual character.

It should be noted that, to achieve a better visual effect of the obtained virtual character, the server may also perform synthesis with reference to a ratio of the head model to the body model. For example, the server determines synthesis sizes of the head model and the body model according to height data of the first user and configured head-to-body ratio data of a normal person, adjusts the head model and the body model to the determined synthesis sizes, and then performs the process of synthesizing the virtual character, so that the obtained virtual character better conforms to the actual appearance of the first user. In fact, to make the virtual character more attractive, the server may also synthesize a "Q-version" virtual character, where the "Q-version" virtual character refers to a virtual character having a head-to-body ratio not conforming to a head-to-body ratio of a normal person. Generally, to make the "Q-version" virtual character cuter, the head-to-body ratio data may be exaggerated. For example, the head-to-body ratio data is 1:1. The server may determine the synthesis sizes of the head model and the body model according to the configured "Q-version" head-to-body ratio data, adjust the head model and the body model to the determined synthesis sizes, and then perform synthesis, thereby obtaining a "Q-version" virtual character.

1002: The server obtains video data of the first user based on the virtual character of the first user and behavior feature data of the first user during the group video session.

The behavior feature data is used for indicating an actual movement of the first user, and at least includes any one of expression feature data, mouth feature data, head orientation feature data, and sight direction feature data. Through the foregoing step 1001, the server obtains a static virtual character. In some embodiments of the present disclosure, to make the virtual character dynamic, the server obtains video data of the first user, and a movement of the virtual character of the first user in the video data matches with an actual movement of the first user. The manner for obtaining the video data is not limited in the embodiments of the present disclosure. For example, based on the foregoing at least four types of behavior feature data, some embodiments of the present disclosure provides at least four video data obtaining manners as follows:

In an obtaining 1, when the behavior feature data includes expression feature data and when the server detects that the expression feature data of the first user is specified expression feature data, the server obtains body feature data corresponding to the specified expression feature data, maps the specified expression feature data to the head model of the virtual character of the first user in real time, and maps the body feature data to the body model of the virtual character of the first user in real time, to obtain the video data of the first user.

To make the virtual character better conform to the current actual appearance of the first user and to express the form of the first user vividly, the server may map the specified expression feature data and the body feature data to the virtual character jointly. In this obtaining manner, the server may obtain, in real time, image data captured by a camera of the first user, and label and track pixels in a face area and facial features positions in the image data, or key pixels in the face area and the facial features positions, thereby capturing the expression feature data of the first user. The key pixels are used for basically describing the facial features positions and the facial features forms. Further, the server may compare a pixel distribution of the expression feature data with a pixel distribution of the specified expression feature data. The specified expression feature data refers to expression feature data already configured on the server. A piece of body feature data is configured corresponding to each piece of specified expression feature data. If a degree of similarity between the expression feature data and the specified expression feature data reaches a preset threshold, it is detected that the expression feature data is the specified expression feature data.

Using the specified expression feature data being mouth opening feature data as an example, if a pixel distribution of a mouth position in the image data captured by the server matches with a pixel distribution of the mouth opening feature data, mouth covering feature data corresponding to the mouth opening feature data can be obtained. Therefore, the server may establish three-dimensional coordinates for the mouth model, and adjust, on the three-dimensional coordinates, a pixel distribution of the mouth model according to the pixel distribution indicated by the mouth opening feature data, thereby mapping the mouth opening feature data to the mouth model in the head model. Similarly, the server may also adjust a pixel distribution of an arm model according to a pixel distribution indicated by the mouth covering feature data, thereby mapping the mouth covering feature data to the arm model in the body model, so that the virtual character is dynamic and the video data of the first user is obtained.

Using the specified expression feature data being crying expression feature data as an example, if a pixel distribution of eye positions in the image data captured by the server matches with a pixel distribution of the crying expression feature data, the server may also obtain eye rubbing feature data corresponding to the crying expression feature data, map the crying expression feature data to the eye model in the head model, and adjust a pixel distribution of an arm model according to a pixel distribution indicated by the eye rubbing feature data, thereby mapping the eye rubbing feature data to the arm model in the body model.

It should be noted that, to make transition of images in the video data proper, the server may also gradually adjust pixel distributions corresponding to the mouth model and the arm model in continuous frames of the video data, thereby obtaining a plurality of frames of video data that can reflect a movement change of the virtual character.

In this obtaining manner, when it is detected that the expression feature data of the actual character appearance of the user matches with the specified expression feature data already configured, body feature data matching with the specified expression feature data is obtained, and a specified expression feature and a body feature are assigned to the virtual character of the user, thereby obtaining video data. When wearing a VR device, the user cannot easily express emotions through body movements directly. Therefore, this obtaining process not only enables the virtual character to simulate actual expressions of the user, but also can predict an emotion of the user according to an expression feature and highlight the emotion of the user through a body feature, thereby simulating the character of the user by using an expression and a body movement jointly, so that the virtual character is more expressive and real.

In an obtaining manner 2, when the behavior feature data includes mouth feature data, the server maps the mouth feature data of the first user to the head model of the virtual character of the first user in real time, to obtain the video data of the first user.

To make the video data of the first user synchronized with mouth movements of the first user during speaking, when receiving audio data of the first user, the server obtains configured mouth feature data, where the mouth feature data is used for indicating that the mouth keeps staying in an open state. Further, the server can map the mouth feature data to the mouth model in the head model in real time, and synthesize the audio data with the virtual character after mapping, thereby obtaining the video data of the first user. The server cancels the mouth model mapping process when the process of receiving the audio data ends, the restores the mouth model to a default state, where the default state refers to that the mouth model stays in a closed state.

In an obtaining manner 3, when the behavior feature data includes head orientation feature data, the server obtains head orientation data of the first user captured by a sensor of the first user, and maps the head orientation feature data of the first user to the head model of the virtual character of the first user in real time, to obtain the video data of the first user.

To make the virtual character express the actual appearance of the first user vividly, the server may obtain, in real time, head orientation data captured by a sensor (such as a nine-axis sensor on the VR device) of the first user, where the head orientation data is at least used for indicating a pitch angle or horizontal rotation angle of the first user. Further, the server can rotate the head model relative to the body model of the virtual character according to the pitch angle or the horizontal rotation angle indicated by the head orientation data, thereby mapping the head orientation feature data to the head model in real time.

Figure 12:
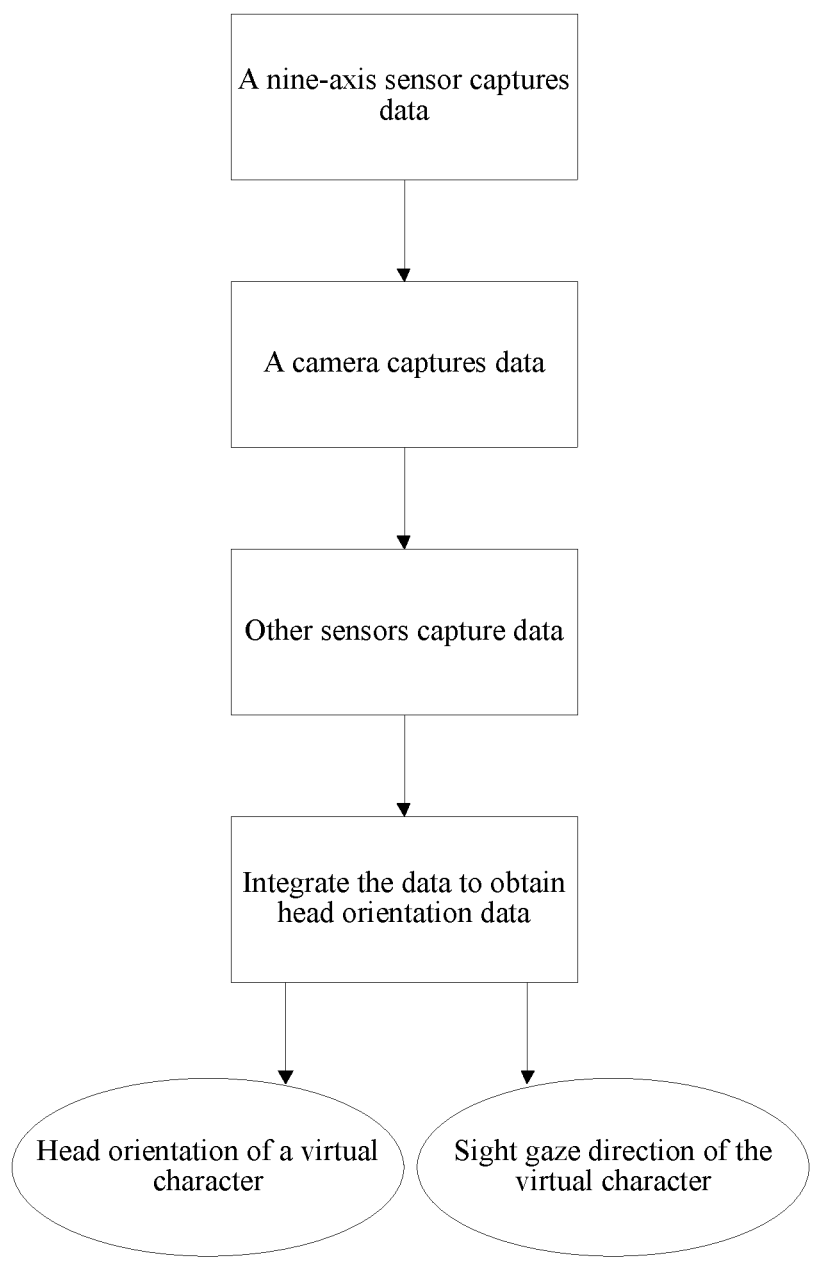
FIG. 12 is a flowchart of obtaining head orientation data according to an embodiment of the present disclosure.

Definitely, to make the obtained head orientation data more accurate, the server may further use the image data captured by the camera of the first user. Referring to FIG. 12, an embodiment of the present disclosure provides a flowchart of obtaining head orientation data. The server may obtain image data captured by the camera. According to pixel changes of the face area in the image data, the server may determine that the head is in a deflected state when pixels in the face area shift to one side collectively, determine a direction opposite to the shift direction as a head deflection direction (in the case of selfie), and determine a deflection angle according to an offset of the pixels, thereby obtaining the head orientation feature data. When the foregoing two manners for obtaining the head orientation feature data are combined, the server may determine a data error between the two pieces of head orientation feature data. If the data error is greater than a tolerance error, the process of obtaining the head orientation feature data may be performed again. If the data error is smaller than the tolerance error, head feature data can be obtained by means of data convergence. For example, an average value of the head feature data is used as correct head feature data.

In an obtaining manner 4, when the behavior feature data includes sight direction feature data, the server obtains eye image data of the first user captured by a camera of the first user; obtains the sight direction feature data of the first user according to the eye image data of the first user; and maps the sight direction feature data of the first user to the head model of the virtual character of the first user in real time, to obtain the video data of the first user.

To enhance interaction between users in the group video session, the server may further obtain sight direction feature data, where the sight direction feature data is used for indicating a position of the eyeball relative to the eye of the first user, and therefore can be used for indicating a gaze direction of the first user.

Because the eyeball and the white of the eye have different colors, the server can lock an eyeball area in the eye image data, and track the position of the eyeball area relative to the eye in real time, thereby obtaining the sight direction feature data. Further, the server can adjust the eyeball position in the eye model according to the sight direction feature data, to generate the video data, thereby mapping the sight direction feature data to the eye model in the head model.

In this obtaining manner, the sight direction feature data of the user is obtained through the captured eye image data, thereby mapping the sight direction feature data of the user to the head model of the virtual character of the first user in real time. In this way, the virtual character can express the real character appearance of the user in further detail, so that the virtual character better matches with the real character appearance of the user. Moreover, eye contact between users in the group video session can be enhanced while details of the sight of each user are expressed, thereby improving the efficiency of the group video session.

Figure 13:
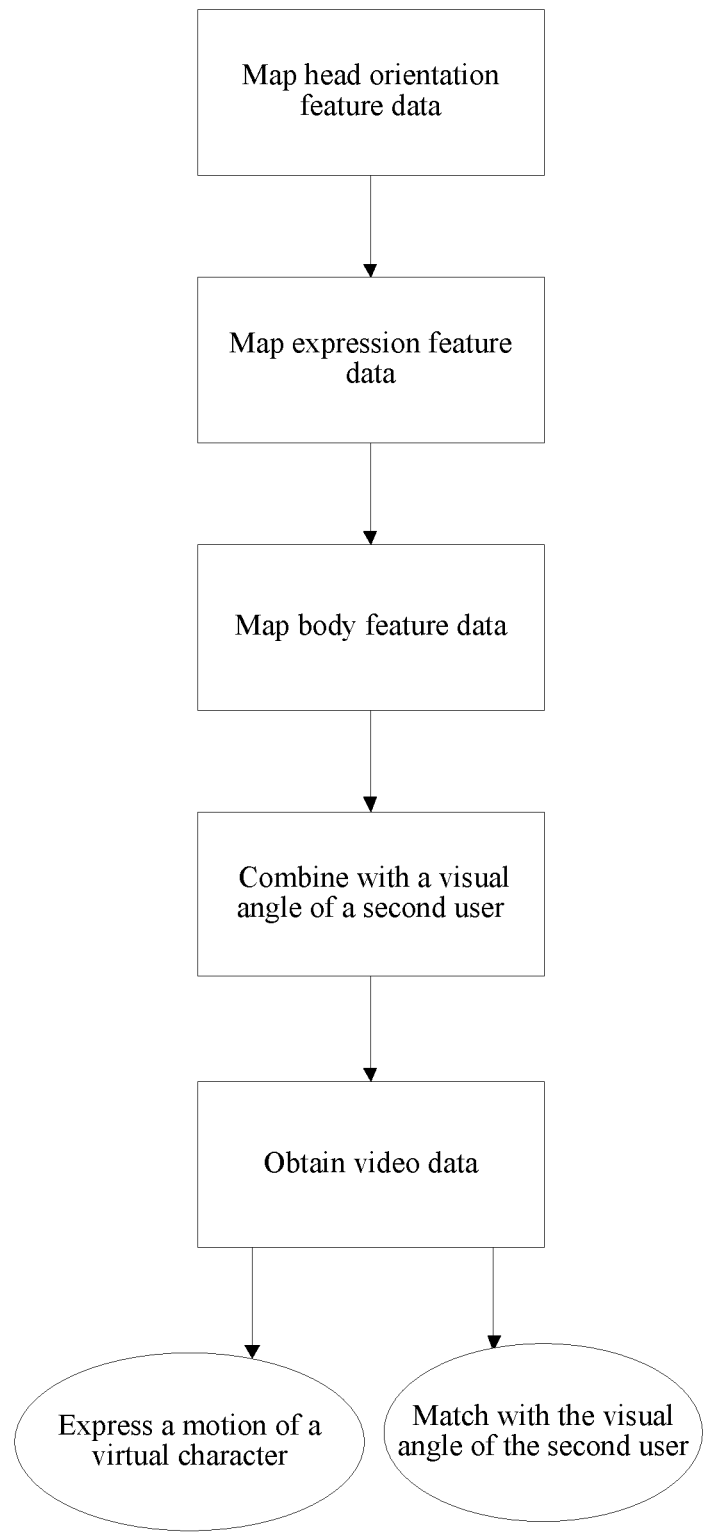
FIG. 13 is a flowchart of obtaining video data according to an embodiment of the present disclosure.

In fact, the video data obtained in step 1002 can be used as initial video data of the first user. To provide a second user in the group video session with video data matching with a visual angle of the second user, the server may further process the initial video data. For example, referring to FIG. 13, an embodiment of the present disclosure provides a flowchart of obtaining video data. The server obtains visual angle data of a second user, and processes the initial video data according to a visual angle indicated by the visual angle data of the second user, to obtain video data of the first user which matches with the visual angle.

The manner for obtaining the visual angle data is not limited in the embodiments of the present disclosure. For example, the server may obtain, according to head orientation feature data captured by a sensor of the second user, visual angle data corresponding to the head orientation feature data of the second user. In this example, the server may determine, according to the head orientation data, that the orientation of the head model after rotation is the visual angle of the second user, thereby obtaining the visual angle data of the second user.

For another example, the server obtains sight direction feature data of the second user according to eye image data captured by a camera of the second user, and obtains the visual angle data of the second user according to the sight direction feature data of the second user. In this example, the server may determine, according to an eyeball position indicated by the sight direction feature data, a direction from the center of the head model to the eyeball position as the visual angle of the second user, thereby obtaining the visual angle data.

Figure 14:
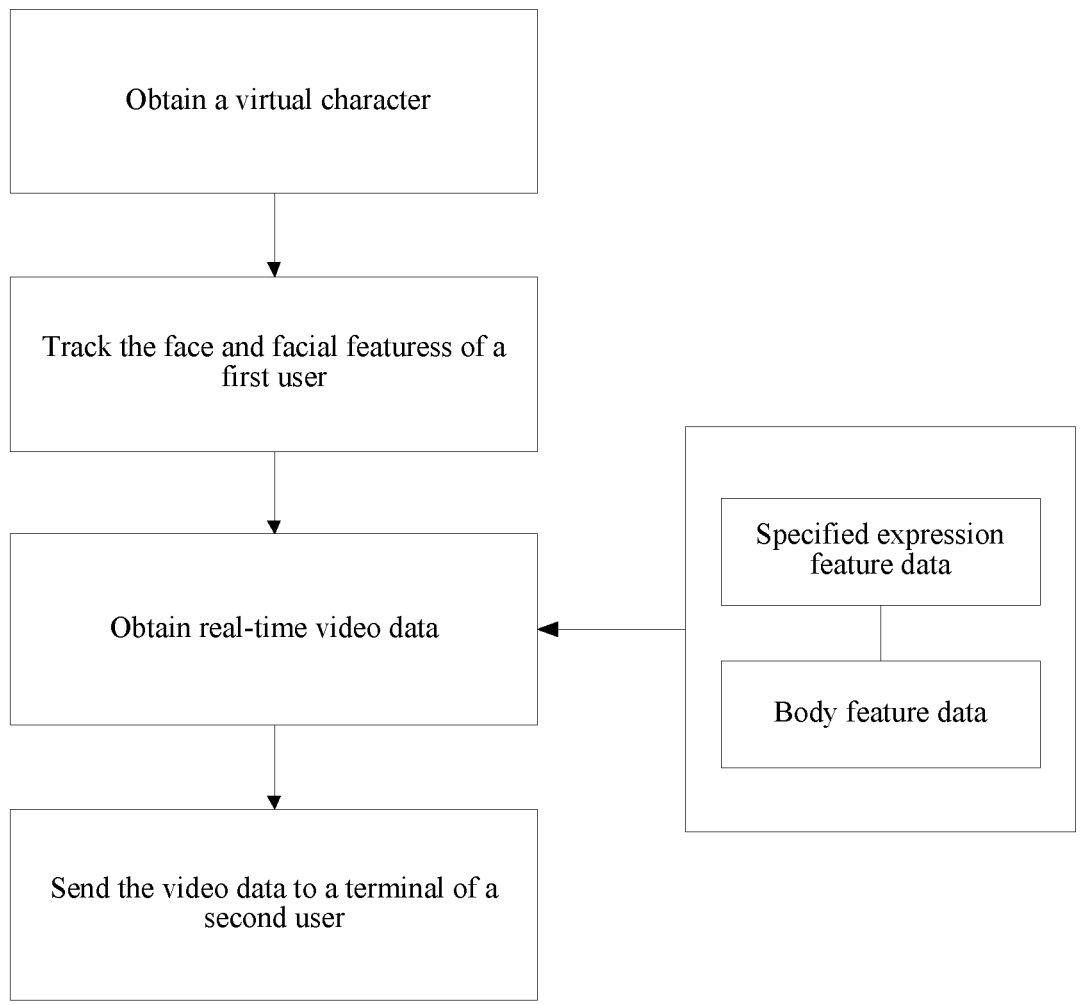
FIG. 14 is a flowchart of a group video session according to an embodiment of the present disclosure.

Further, based on the visual angle data of the second user, the server may determine a field of view, in the initial video data, of the visual angle indicated by the visual angle data, thereby extracting video data within the field of view as the video data of the first user. Referring to FIG. 14, an embodiment of the present disclosure provides a flowchart of a group video session. In the group video session, the server may obtain the virtual character, and track the face and facial features of the first user in real time, so as to obtain real-time video data, and send the video data to a terminal of the second user in real time.

1003: The server sends the video data of the first user to a terminal of a second user participating in the group video session, so as to implement the group video session.

Figure 15:
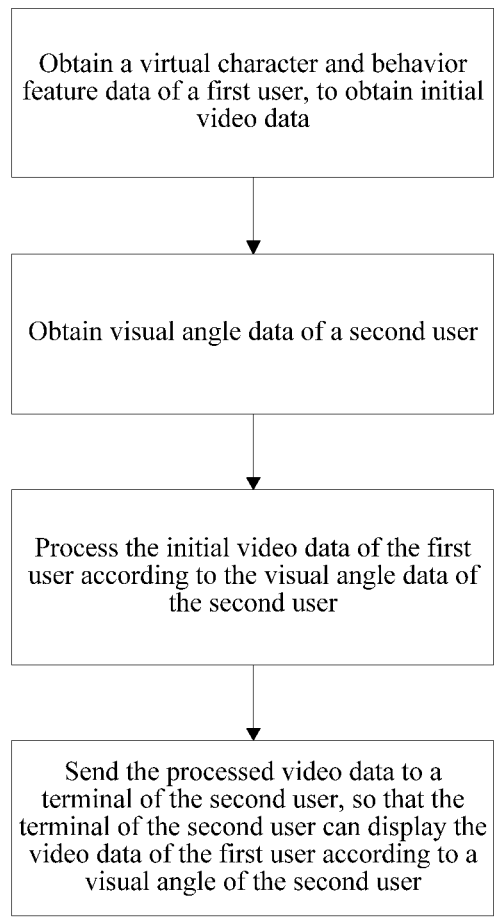
FIG. 15 is a flowchart of displaying video data according to an embodiment of the present disclosure.

In some embodiments of the present disclosure, for any user in the group video session, the server can obtain video data of the user according to steps 1001 and 1002. Therefore, to display virtual characters of all the users synchronously, the server may synthesize video data of each user in the group video session, and send the synthesized video data to the terminal of the second user. When receiving the video data, the terminal of the second user can display the video data in real time. Moreover, the video data matches with the visual angle of the second user, thereby implementing the group video session. Referring to FIG. 15, an embodiment of the present disclosure provides a flowchart of displaying video data. The server obtains the initial video data, processes the initial video data according to the visual angle data of the second user, and sends the processed video data to the terminal of the second user, so that the terminal of the second user can display the video data in real time according to the visual angle of the second user. It should be noted that, when some embodiments of the present disclosure is performed by the VR device of the first user, the video data may be sent to the server, and the server sends the video data to the terminal of the second user.

In some embodiments of the present disclosure, a virtual character of a first user in a group video session is obtained according to head feature data of the first user and a body model corresponding to the first user, so that the virtual character can match with an actual appearance of the first user. Moreover, video data of the first user is obtained based on the virtual character and behavior feature data, so that movements of the virtual character of the first user can simulate actual movements of the first user in real time, thereby expressing the actual appearance of the first user more vividly and enhancing a visual effect during the group video session.

In addition, a specific manner for obtaining the virtual character is provided. A head model matching with the head feature data is generated according to the head feature data, and the body model corresponding to the first user is determined according to a user attribute of the first user. The virtual character is obtained by synthesizing the head model with the body model, thereby refining an obtaining process of each part of the virtual character, so that the virtual character has more refined features and express the actual appearance of the first user in further details. Moreover, the body model is obtained according to the user attribute, so that the virtual character is closer to the actual appearance of the user.

In addition, a specific manner for obtaining the head feature data is provided. The head feature data of the first user is determined by analyzing a color distribution of a head image of the first user, and the head feature data can be used for indicating a hair area, a hair color, a face area, a face color, facial features positions, and facial features forms of the first user, thereby obtaining a plurality of features of the actual head appearance of the first user, so that the actual head appearance of the first user can be described in further detail and more comprehensively.

In addition, a specific process of generating the head model matching with the head feature data is provided. A face profile model and a hair profile model are determined according to the face area and the hair area, and are filled according to the face color and the hair color. Moreover, according to the facial feature positions, facial features models matching with the facial feature forms are synthesized to the face profile model, thereby refining the process of generating the head model. In addition, a generating process of each part in the head model matches with the actual head appearance of the first user, so that the virtual character better matches with the first user actual appearance.

In addition, at least three manners for determining the body model of the first user are provided. The body model matching with the user attribute of the first user is determined according to the gender, age, occupation or other user attributes of the first user. Moreover, the three determining manners can also be combined with each other, so that the body model better conforms to the actual appearance of the first user, and moreover, the manners for determining the body model are more diversified.

In addition, a specific manner for obtaining the video data of the first user when the behavior feature data includes expression feature data is specifically described. When it is detected that the expression feature data is specified expression feature data, body feature data corresponding to the specified expression feature data may be obtained, thereby mapping the specified expression feature data to the face and mapping the body feature data to the body model, so that the virtual character of the first user has a more vivid expression form.

In addition, a specific manner for obtaining the video data of the first user when the behavior feature data includes mouth feature data, head orientation feature data, and sight direction feature data is specifically described. The virtual character can express the actual appearance of the first user more vividly, and moreover, the manners for determining the video data of the first user are more diversified.

In addition, a manner for processing initial video data according to a visual angle indicated by visual angle data of a second user is further provided. Therefore, the video data of the first user which better matches with the visual angle of the second user is obtained, so that the visual angle for displaying the virtual character of the first user for the second user better conforms to the actual visual effect.

In addition, at least two manners for obtaining the visual angle data of the second user are provided. The visual angle data is obtained according to head orientation feature data captured by a sensor of the second user or according to eye image data captured by a camera of the second user. In this way, the visual angle of the second user can be obtained in real time, and moreover, manners for obtaining the visual angle data are more diversified.

Figure 16:
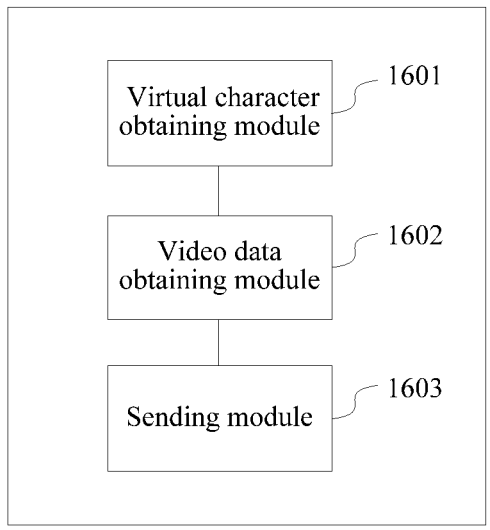
FIG. 16 is a block diagram of a group video session apparatus according to an embodiment of the present disclosure.

FIG. 16 is a block diagram of a group video session according to an embodiment of the present disclosure. Referring to FIG. 16, the apparatus specifically includes:
a virtual character obtaining module 1601, configured to obtain a virtual character of a first user in a group video session, the virtual character of the first user being obtained at least according to head feature data of the first user and a body model corresponding to the first user;
a video data obtaining module 1602, configured to obtain video data of the first user based on the virtual character of the first user and behavior feature data of the first user during the group video session, a movement of the virtual character of the first user in the video data matching with an actual movement of the first user; and
a sending module 1603, configured to send the video data of the first user to a terminal of a second user participating in the group video session, so as to implement the group video session.

In some embodiments of the present disclosure, a virtual character of a first user in a group video session is obtained according to head feature data of the first user and a body model corresponding to the first user, so that the virtual character can match with an actual appearance of the first user. Moreover, video data of the first user is obtained based on the virtual character and behavior feature data, so that movements of the virtual character of the first user can simulate actual movements of the first user in real time, thereby expressing the actual appearance of the first user more vividly and enhancing a visual effect during the group video session.

Optionally, the virtual character obtaining module 1601 is configured to: obtain the head feature data of the first user; generate, according to the head feature data, a head model matching with the head feature data; determine the body model corresponding to the first user according to a user attribute of the first user; and synthesize the head model with the body model, to obtain the virtual character of the first user.

Optionally, the virtual character obtaining module 1601 is configured to: obtain head image data of the first user; and analyze a color distribution of the head image data to obtain head feature data, the head feature data being used for indicating a hair area, a hair color, a face area, a face color, facial features positions, and facial features forms of the first user.

Optionally, the virtual character obtaining module 1601 is configured to: determine a head profile model according to the face area and the hair area, the head profile model including a face profile model and a hair profile model; fill the face profile model and the hair profile model according to the face color and the hair color; obtain facial features models matching with the facial features forms; synthesize the facial features models to the face profile model according to the facial features positions, to generate the head model matching with the head feature data.

Optionally, the virtual character obtaining module 1601 is configured to: determine a body model matching with gender data of the first user according to the gender data of the first user; and/or, the virtual character obtaining module 1601 is configured to: determine a body model matching with age data of the first user according to the age data of the first user; and/or, the virtual character obtaining module 1601 is configured to: determine a body model matching with occupation data of the first user according to the occupation data of the first user.

Optionally, the behavior feature data includes expression feature data, and the video data obtaining module 1602 is configured to: when it is detected that the expression feature data of the first user is specified expression feature data, obtain body feature data corresponding to the specified expression feature data; and map the specified expression feature data to the head model of the virtual character of the first user in real time, and map the body feature data to the body model of the virtual character of the first user in real time, to obtain the video data of the first user.

Optionally, the behavior feature data includes mouth feature data, and the video data obtaining module 1602 is configured to: map the mouth feature data of the first user to the head model of the virtual character of the first user in real time, to obtain the video data of the first user.

Optionally, the behavior feature data includes head orientation feature data, and the video data obtaining module 1602 is configured to: obtain head orientation data of the first user captured by a sensor of the first user; and map the head orientation feature data of the first user to the head model of the virtual character of the first user in real time, to obtain the video data of the first user.

Optionally, the behavior feature data includes sight direction feature data, and the video data obtaining module 1602 is configured to: obtain eye image data of the first user captured by a camera of the first user; obtain the sight direction feature data of the first user according to the eye image data of the first user; and map the sight direction feature data of the first user to the head model of the virtual character of the first user in real time, to obtain the video data of the first user.

Optionally, the video data obtaining module 1602 is configured to: obtain initial video data of the first user based on the virtual character of the first user and the behavior feature data of the first user; obtain visual angle data of a second user; and process the initial video data according to a visual angle indicated by the visual angle data of the second user, to obtain video data of the first user which matches with the visual angle.

Optionally, the video data obtaining module 1602 is configured to: obtain, according to head orientation feature data captured by a sensor of the second user, visual angle data corresponding to the head orientation feature data of the second user; or the video data obtaining module 1602 is configured to: obtain sight direction feature data of the second user according to eye image data captured by a camera of the second user, and obtain the visual angle data of the second user according to the sight direction feature data of the second user.

All the foregoing optional technical solutions can be combined in any manner to form optional embodiments of the present disclosure, which are not elaborated herein.

Figure 17:
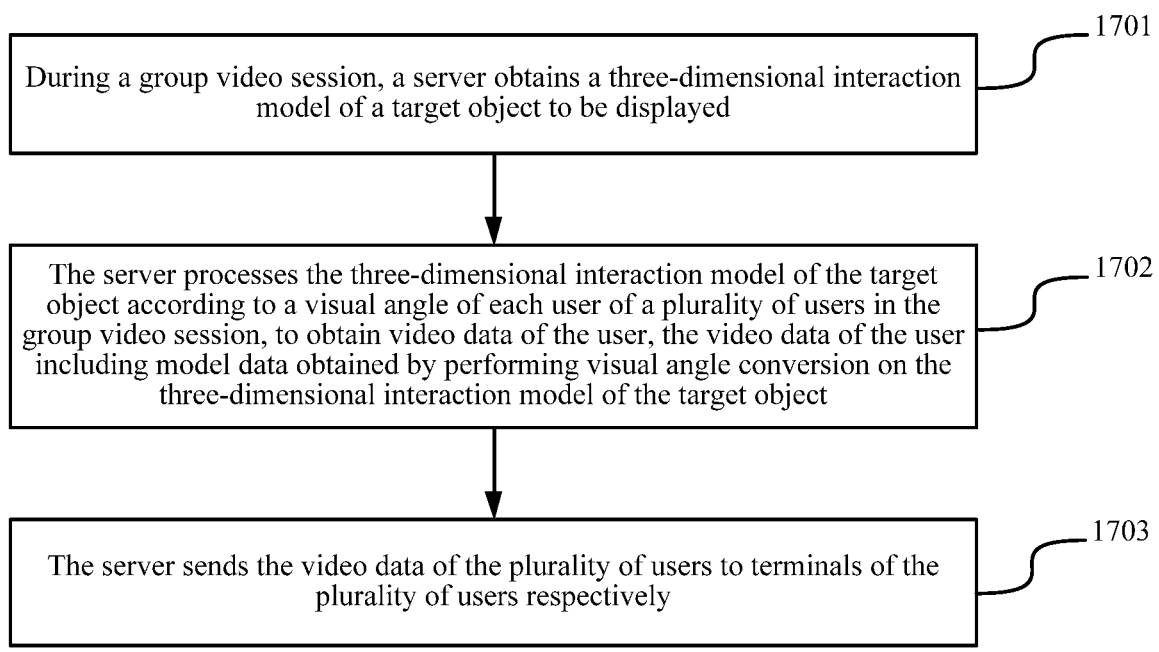
FIG. 17 is a flowchart of a group video communication method according to an embodiment of the present disclosure.

During the group video session, not only the virtual character of each user participating in the session but also some three-dimensional object models can be displayed. In addition, the three-dimensional object model can be displayed from different angles according to some operations of a user. Refer to the following embodiment shown in FIG. 17:

FIG. 17 is a flowchart of a group video communication method according to an embodiment of the present disclosure. The method is applied to a server, and specifically includes the following steps:

1701: During a group video session, a server obtains a three-dimensional interaction model of a target object to be displayed.

Figure 18:
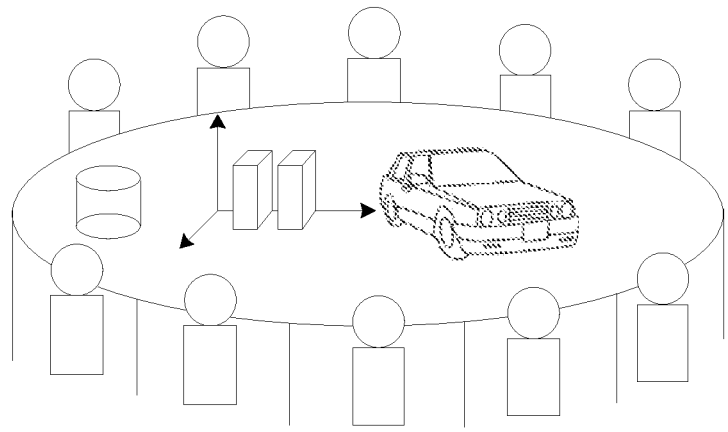
FIG. 18 is a schematic diagram of a three-dimensional interaction model according to an embodiment of the present disclosure.

The group video session refers to a video session performed by a plurality of (two or more) users based on a server. The plurality of users may be a plurality of users on a social platform corresponding to the server, and the plurality of users may have a group relationship or a friendship. The target object refers to an object that a user in the group video session wants to display. The three-dimensional interaction model refers to a three-dimensional model generated according to the target object, and is used for being displayed in video data of the plurality of users based on control by any user in the group video session. For example, FIG. 18 is a schematic diagram of a three-dimensional interaction model according to an embodiment of the present disclosure. Referring to FIG. 18, the three-dimensional interaction model may be a three-dimensional geometric model, a three-dimensional automobile model, and a three-dimensional chart model.

In this step, the server may obtain the three-dimensional interaction model in multiple manners. For example, the server may obtain a three-dimensional object model uploaded by a fifth user. In this example, the three-dimensional interaction model may be a model obtained by the fifth user through computer aided design (CAD), for example, a three-dimensional automobile model.

For another example, the server obtains a two-dimensional table uploaded by a sixth user, and processes the two-dimensional table to obtain the three-dimensional table model. In this example, the server may directly generate the three-dimensional table model corresponding to the two-dimensional table through an EXCEL table. Alternatively, the server may also establish a three-dimensional coordinate model (x, y, z). For example, when there are two parameters (such as class and head count) in the two-dimensional table, the server may use different planar areas on the (x, y) plane to represent different "class" parameter values, and determine a "head count" parameter value corresponding to each "class" parameter value as a z-coordinate corresponding to the "class" parameter value, thereby generating a three-dimensional table model in a form of a histogram. Definitely, with reference to the foregoing example, the server may also generate three-dimensional table models in other forms, such as a pie chart and a bar chart. Moreover, when generating the three-dimensional table model, the server may also set colors of the three-dimensional table model. For example, different parameters correspond to different colors.

In fact, based on at least one piece of two-dimensional image data of a target object uploaded by a user, the server may perform three-dimensional modeling for the target object, for example, by using a shape from shading (SFS) algorithm, so as to obtain a three-dimensional interaction model.

The fifth user or the sixth user may be any user in the group video session. Further, the fifth user or the sixth user may also be a user having an uploading right. The user having the uploading right is not limited in the embodiments of the present disclosure. For example, the user having the uploading right may be an initiator of the group video session, or a very important people (VIP) user.

1702: The server processes the three-dimensional interaction model of the target object according to a visual angle of each user of a plurality of users in the group video session, to obtain video data of the user, the video data of the user including model data obtained by performing visual angle conversion on the three-dimensional interaction model of the target object.

In this step, the server can obtain visual angle data of each user in the group video session, and determine a visual angle of the user according to the visual angle data of the user and a display position of a virtual character of the user. Further, the server can extract image data of a three-dimensional interaction model corresponding to the visual angle, synthesize the extracted image data with session environment data, and perform stereo coding on the image data to obtain frame-by-frame video data of the user. The method for stereo coding is not limited in the embodiments of the present disclosure. For example, according to an interleaving display principle, the server codes the synthesized image data into video data of two fields. The two fields are an odd field formed by odd-number traces and an even field formed by even-number traces, so that a VR device can display the video data of the two fields in a left-eye screen and a right-eye screen in an interleaved manner when receiving the video data, thereby producing parallax between the two eyes of the user and achieving a three-dimensional display effect. In addition, the session environment data is not limited to a virtual environment corresponding to the group video session, virtual characters corresponding to the plurality of users respectively, audio data of each user, and the like.

It should be noted that, the manner for obtaining the visual angle data is not limited in the embodiments of the present disclosure. For example, the server may obtain, according to head orientation feature data captured by a sensor of the user, visual angle data corresponding to the head orientation feature data of the second user. For another example, the server obtains sight direction feature data of the user according to eye image data captured by a camera of the user, and determines the visual angle data of the user according to eyeball positions indicated by the sight direction feature data.

In fact, to better display the three-dimensional interaction model, before obtaining the video data, the server may further determine a display position of the three-dimensional interaction model in different manners. For example, a default display position is configured on the server, where the default display position may be a position opposite to the virtual characters of the plurality of users. For another example, a position next to a user uploading the three-dimensional interaction model is determined as the display position, so that the user can illustrate the three-dimensional interaction model conveniently.

In some embodiments of the present disclosure, to further expand the communication manner in the group video session and improve actual efficiency of the video session, when receiving an operation instruction for the three-dimensional interaction model, the server may adjust the three-dimensional interaction model according to an operation manner corresponding to the operation instruction, and perform, based on the adjusted three-dimensional interaction model, the steps of processing and sending according to the visual angle of each user of the plurality of users in the group video session. The operation instruction is used for instructing to adjust the three-dimensional interaction model according to a corresponding operation manner. The manner for obtaining the operation instruction is not limited in the embodiments of the present disclosure. For example, the server may use at least two obtaining manners as follows:

In an obtaining manner 1, the server obtains gesture feature data of a first user, and when the gesture feature data matches with any operation manner of the three-dimensional interaction model, the server determines that an operation instruction corresponding to the operation manner is received.

The gesture feature data is used for representing a gesture of the first user. The gesture feature data may be obtained in multiple manners, for example, by using a camera or a gesture sensor. Using a gesture sensor on the VR device of the first user as an example, the server can obtain gesture feature data captured by the gesture sensor, determine a gesture of the first user according to the gesture feature data, when the gesture matches with a preset gesture (for example, pointing leftwards, rightwards, upwards or downwards), determine an operation manner corresponding to the preset gesture as an operation manner matching with the gesture, and generate and obtain an operation instruction corresponding to the operation manner. Specific operation manners are not limited in the embodiments of the present disclosure. For example, referring to Table 4, one embodiment of the present disclosure provides a correspondence between preset gestures and operation manners:

TABLE 4

| Preset gesture | Operation manner |
| --- | --- |
| Point upwards | Move the three-dimensional interaction model upwards |
| Point downwards | Move the three-dimensional interaction model downwards |
| Point leftwards | Rotate the three-dimensional interaction model leftwards |
| Point rightwards | Rotate the three-dimensional interaction model rightwards |

In an obtaining manner 2, the server obtains operation information of a second user with respect to a peripheral device, and when the operation information matches with any operation manner of the three-dimensional interaction model, the server determines that an operation instruction corresponding to the operation manner is received, where the peripheral device is bound to the terminal of the second user.

The peripheral device may be a mouse or a keyboard. When the server obtains the operation information of the second user with respect to the peripheral device, it can be determined whether there is an operation manner corresponding to the operation information, and if yes, an operation instruction corresponding to the operation manner is generated and obtained. Referring to Table 5, one embodiment of the present disclosure provides a correspondence between preset gestures and operation manners:

TABLE 5

| Operation information | Operation manner |
| --- | --- |
| Click the left mouse button | Scale up the three-dimensional interaction model |
| Click the right mouse button | Scale down the three-dimensional interaction model |
| Long-press the left mouse button to move | Rotate the three-dimensional interaction model along the movement direction of the mouse |

Definitely, the first user and the second user each may be any user in the group video session, or may be a user having a right to operate the three-dimensional interaction model, which is not limited in the embodiments of the present disclosure.

In a practical application scenario, to provide an interaction service for the user intelligently, it is also possible to prompt the user that the user is allowed to operate the three-dimensional interaction model and how to operate the three-dimensional interaction model. Time for making a prompt is not limited in the embodiments of the present disclosure. For example, a prompt is made at an appropriate time when it is determined that the user needs to operate the three-dimensional interaction model: When detecting that the seventh user gazes at the three-dimensional interaction model for longer than preset duration, the server sends operation prompt information to a terminal of the seventh user, the operation prompt information being used for prompting that the seventh user is capable of operating the three-dimensional interaction model. That is, the operation prompt information can indicate that the three-dimensional interaction model is interactive and can respond/react to user operation(s).

The description about the seventh user is similar to the description about the first user. In the foregoing example, the server can monitor a gaze direction of the seventh user in real time, and start timing upon detecting that the gaze direction of the seventh user is aligned with the three-dimensional interaction model. When timing duration (that is, the gaze duration) is greater than the preset duration, it indicates that the seventh user probably needs to operate the three-dimensional interaction model. Therefore, the operation prompt information is sent to the terminal of the seventh user. Specific content of the operation prompt information is not limited in the embodiments of the present disclosure. Using that the server supports operations with a mouse as an example, the operation prompt information may include text prompt information "you can operate the automobile model through the mouse", and a specific method for operating with a mouse, for example "click the left button of the mouse to scale up the automobile model" and "click the right button of the mouse to scale down the automobile model".

Through the foregoing operation process of the user, the server can obtain the operation instruction, and adjust the three-dimensional interaction model according to the operation manner corresponding to the operation instruction. Specific adjustment processes are not limited in the embodiments of the present disclosure. For example, when the operation instructions are a rotation operation instruction, a scaling operation instruction, and a shift operation instruction respectively, corresponding adjustment processes may be specifically as follows:

In an adjustment process 1, when the operation instruction is a rotation operation instruction, the server obtains a rotation angle and a rotation direction corresponding to the rotation operation instruction, and rotates the three-dimensional interaction model according to the rotation angle and the rotation direction.

In this adjustment process, the server may extract the rotation angle and the rotation direction carried in the rotation operation instruction, and rotate the three-dimensional interaction model based on the two rotation parameters and the three-dimensional interaction model seen from the current visual angle of the user. The rotation angle and the rotation direction are determined when the rotation operation instruction is generated. Specific determining manners are not limited in the embodiments of the present disclosure. For example, when the rotation operation instruction is generated according to the gesture feature data, the rotation direction may be the same as a gesture direction; the rotation angle may also be a default rotation angle, such as 30 degrees, or determined according to duration of the gesture, for example, rotation angle=duration (in seconds) *30 degrees. For another example, when the rotation operation instruction is generated according to the operation information, the rotation direction may be the same as a movement direction of the peripheral device, and the rotation angle may be determined according to a movement distance of the peripheral device, for example, rotation angle=movement distance (in centimeters)*10 degrees.

In an adjustment process 2, when the operation instruction is a scaling operation instruction, the server obtains a scaling-down ratio or a scaling-up ratio corresponding to the scaling operation instruction, and scales down or up the three-dimensional interaction model according to the scaling-down ratio and the scaling-up ratio.

In this adjustment process, the server may extract the scaling-down ratio and the scaling-up ratio carried in the scaling operation instruction, and scale down or up the three-dimensional interaction model based on the scaling ratio and the three-dimensional interaction model seen from the current visual angle of the user. The scaling ratio may be determined when the scaling operation instruction is generated. Specific determining manners are not limited in the embodiments of the present disclosure. For example, when the scaling operation instruction is generated according to the operation information, each operation may correspond to a default scaling ratio. For example, a click on the left button of the mouse corresponds to scaling up the three-dimensional interaction model by 10%.

In an adjustment process 3, when the operation instruction is a shift operation instruction, the server obtains a shift direction and a shift distance corresponding to the shift operation instruction, and shifts the three-dimensional interaction model according to the shift direction and the shift distance.

In this adjustment process, the server may extract the shift direction and the shift distance carried in the shift operation instruction, and shift the three-dimensional interaction model based on the two parameters and the three-dimensional interaction model seen from the current visual angle of the user. The shift direction and the shift distance may be determined when the shift operation instruction is generated. Specific determining manners are not limited in the embodiments of the present disclosure. For example, when the shift operation instruction is generated according to the gesture feature data, the shift direction may be the same as a gesture direction; the shift distance may be determined according to duration of the gesture, for example, shift distance=duration (in seconds)*10% of the length of the three-dimensional interaction model. For another example, when the shift operation instruction is generated according to the operation information, the shift direction may be the same as a movement direction of the peripheral device, and the shift distance may be determined according to a movement distance of the peripheral device, for example, shift distance=movement distance (in centimeters)*5% of the length of the three-dimensional interaction model.

Definitely, the server may receive at least two operation instructions mentioned above at the same time. In this case, the server may perform at least two adjustment processes in series, or perform at least two adjustment processes concurrently. For example, when the server receives a rotation operation instruction and a shift operation instruction at the same time, to present a change process of the three-dimensional interaction model more clearly, the server may first rotate and then shift the three-dimensional interaction model; alternatively, to link the adjustment processes with operation processes of the user, the server may rotate and shift the three-dimensional interaction model simultaneously.

It should be noted that, in the process of adjusting the three-dimensional interaction model, the server may generate frame-by-frame video data in real time corresponding to the adjustment process. That is, according to the currently adjusted three-dimensional interaction model, the server synthesizes and codes the currently adjusted three-dimensional interaction model with the session environment data according to the current visual angle of the user, to obtain a current frame of video data, thereby presenting a dynamic adjustment process of the three-dimensional interaction model for the user.

Figure 19:
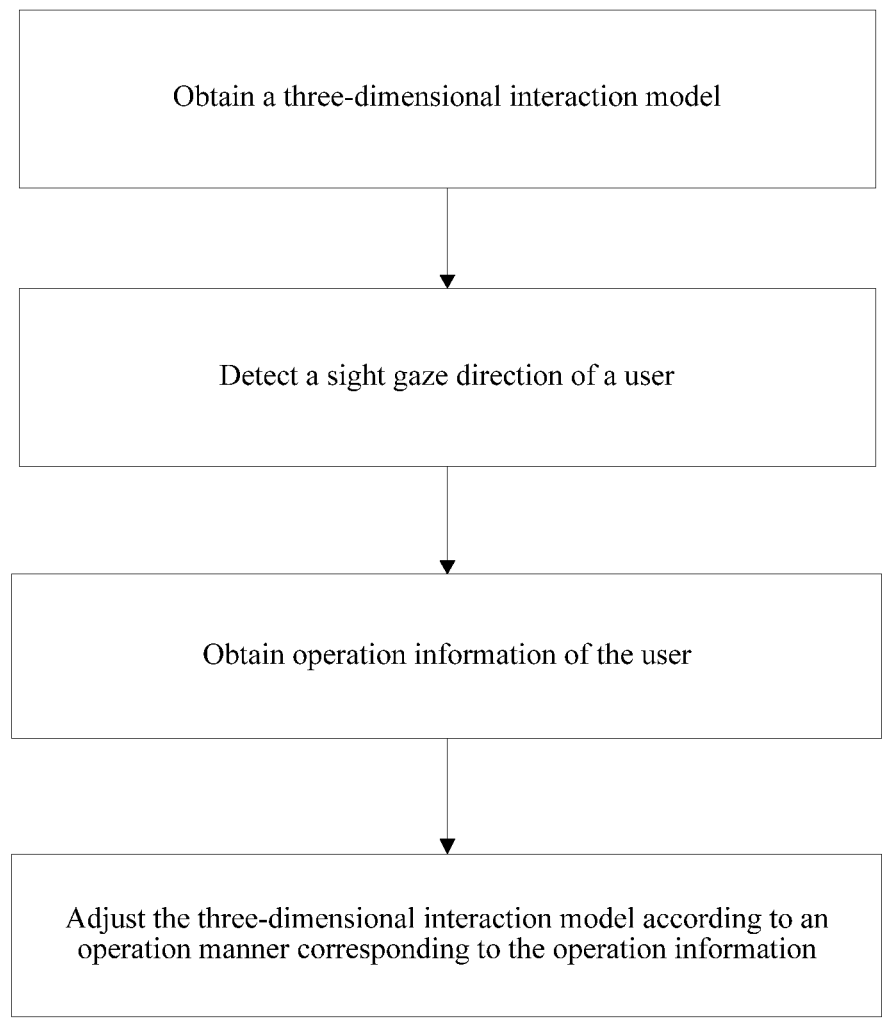
FIG. 19 is a flowchart of adjusting a three-dimensional interaction model according to an embodiment of the present disclosure.

In addition, it should be noted that, in the foregoing adjustment process, the server may serve each user individually, that is, the server processes the three-dimensional interaction model according to the operation instruction triggered by each user, and obtains video data of the user. When an operation right is required for operating the three-dimensional interaction model, the server may also process, according to operation instructions triggered by all users having an operation right, the three-dimensional interaction model from visual angles of all the users, thereby obtaining video data of all the users. To clearly illustrate the procedure of the adjustment process, referring to FIG. 19, an embodiment of the present disclosure provides a flowchart of adjusting a three-dimensional interaction model. The server obtains a three-dimensional interaction model, monitors a gaze direction of a user, obtains operation information, and further adjusts the three-dimensional interaction model according to an operation manner corresponding to the operation information.

During the group video session, to make video sessions of the plurality of users performed in an orderly manner and emphasize a speaking process of a particular user, when receiving a speaking request of a third user, the server may generate specified video data, where the specified video data is used for presenting a process of transferring a virtual microphone from a virtual host to a virtual character of the third user; and based on the specified video data, the server performs the steps of processing and sending according to the visual angle of each user of the plurality of users in the group video session.

The third user may be any user in the group video session. Manners for triggering the speaking request are not limited in the embodiments of the present disclosure. For example, the speaking request is triggered automatically when the server receives audio data from the third user, or the speaking request is triggered when the server detects specified operation information of the third user, where the specified operation information may be double clicks on the left button of the mouse. The virtual host may be a virtual character obtained by the server from a virtual character database, or may be a virtual character of a user in the group video session. The manner for obtaining the virtual host is not limited in the embodiments of the present disclosure. For example, the server obtains, according to a group attribute of a group corresponding to the group video session, a virtual host matching with the group attribute. For example, when the group attribute is class, dress of the matching virtual host is school uniform; when the group attribute is company, dress of the matching virtual host is business suit. For another example, the server randomly designates a virtual character of a user as the virtual host; alternatively, when the group video session begins, the server sends, to a VR device, vote information for voting for a virtual host, where the vote information at least includes user information of a plurality of users, and the VR device displays a vote interface according to the vote information. When any user A selects a piece of user information b on the vote interface, the server can determine that the user A votes for a user B corresponding to the user information b. In this way, the server can obtain a user with the most votes through statistical collection, and use the virtual character of the user as the virtual host.

Based on the foregoing description, when receiving the speaking request of the third user, the server can determine a movement path of the virtual microphone according to a display position C of the third user in the virtual environment and a current display position D of the virtual microphone, where the movement path may be a path from D to C (alternatively, the server further determines, according to a display position E of the virtual host, a path from D to E to C as the movement path). Then, the server can generate frame-by-frame specified video data according to the movement path of the virtual microphone, to dynamically represent a transfer process of the virtual microphone. Further, the server can process and send the video data according to the visual angle of each user. Definitely, to display the virtual microphone more properly, when the virtual microphone reaches the display position of the third user, the server can determine a raising path of an arm model of the virtual character of the third user, so that at least one frame of the generated specified video data corresponds to a process of raising the arm model and holding the virtual microphone. In addition, in the transfer process, the server may synthesize specified audio data of the virtual host to specified video data, where the specified audio data is used for indicating that the third user is going to speak, and may include a voice "now please welcome the third user to speak".

In fact, in addition to the foregoing method of transferring the virtual microphone, a speaking process of a user can also be emphasized by using other methods. For example, when receiving the speaking request of the third user, the server lowers a volume of audio data of a fourth user, where the fourth user is a user other than the third user in the group video session; and based on the adjusted audio data, the server performs the steps of processing and sending according to the visual angle of each user of the plurality of users in the group video session. In this example, the server may adjust, according to a volume V1 of audio data of the third user, a volume V2 of the audio data of the fourth user to be lower than V1.

It should be noted that, the foregoing two methods for emphasizing the user speaking process may also be combined. That is, when receiving the speaking request of the third user, the server may generate specified video data, where the specified video data is used for presenting a process of transferring the virtual microphone from the virtual host to the virtual character of the third user, and the volume of the audio data of the fourth user in the specified video data is lowered.

In an actual application scenario, the server may receive a speaking request of the fourth user when the third user is speaking. In this case, the manner for processing the speaking request of the fourth user by the server is not limited in the embodiments of the present disclosure. For example, the server temporarily stores the speaking request of the fourth user, and when it is detected that the audio data of the third user is finished, continues to process the speaking request of the fourth user in the same processing manner as that of the speaking request of the third user according to a receiving sequence of the speaking requests. Definitely, when the fourth user waits to speak, the server may send speaking prompt information to the terminal of the fourth user, where the speaking prompt information is used for indicating time for the fourth user to speak, and may include text information such as "you are the next speaker".

In some embodiments of the present disclosure, to further improve the efficiency of the group video session and expand the interaction manner during the group video session, when receiving a multimedia file playing request, the server may synthesize a multimedia file corresponding to the multimedia playing request to video data of a plurality of users. The multimedia file is, for example, an audio file, a video file, or a text file. The multimedia file playing request may directly carry the multimedia file, or may carry a file identifier of the multimedia file, so that the server obtains, from a multimedia database or a network, a multimedia file corresponding to the file identifier. In the expanded interaction manner, the multimedia file synthesis method is not limited in the embodiments of the present disclosure. For example, when the multimedia file is an audio file, the server may synthesize the audio file as background audio to the video data; when the multimedia file is a video file, the server may synthesize, according to the visual angle of each user, the video file to a virtual environment opposite to the user, so that the video file is embedded in the virtual environment in a "screen playing" manner.

Figure 20:
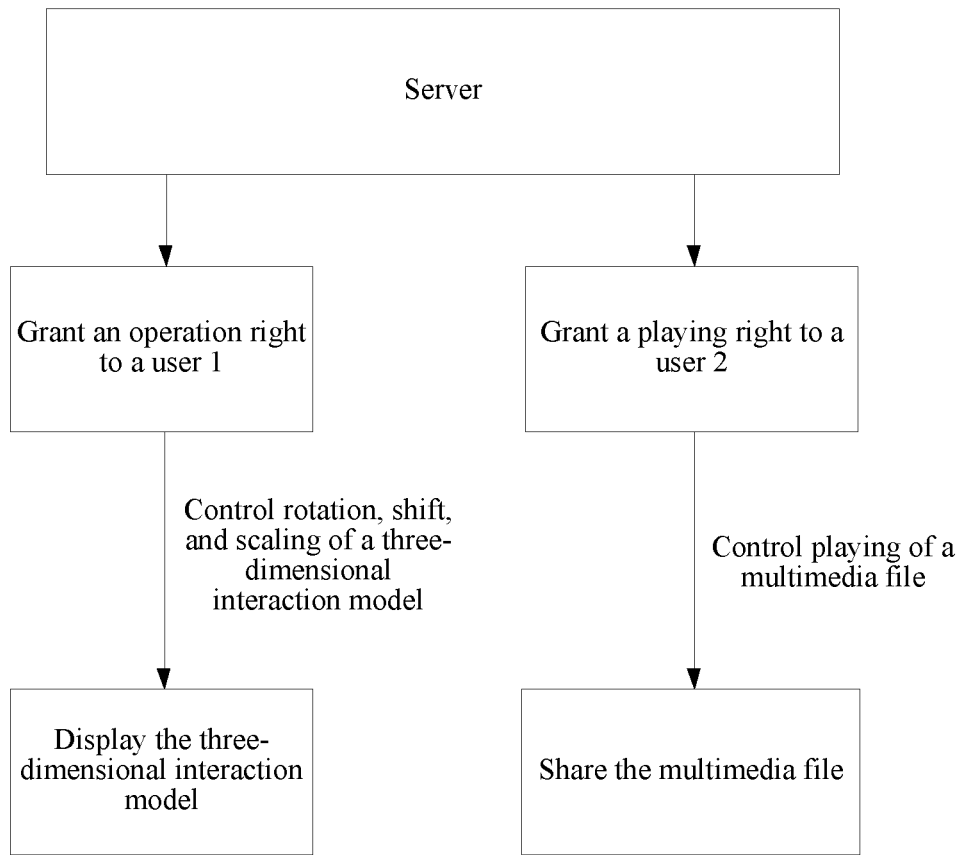
FIG. 20 is a flowchart of interaction according to an embodiment of the present disclosure.

Based on the foregoing expanded interaction manner, referring to FIG. 20, an embodiment of the present disclosure provides an interaction flowchart. The server may grant, to a user 1, a right to operate the three-dimensional interaction model, and grant, to a user 2, a right to play the multimedia file. Therefore, the server can adjust the three-dimensional interaction model based on operation information of the user 1, thereby providing a service of operating the three-dimensional interaction model. The server can also synthesize the multimedia file to the video data based on a multimedia file playing request of the user 2, thereby providing a multimedia file sharing service.

1703: The server sends the video data of the plurality of users to terminals of the plurality of users respectively.

In this step, when receiving the video data, the terminals may display the video data. Because the video data is processed according to the visual angles of the users, each user can see, from the video data, the three-dimensional interaction model at the visual angle of the user.

It should be noted that, when the user uses a VR device, the server may directly send the video data to the VR device of the user. When the user uses a conventional terminal, the server may extract two-dimensional video data from a particular visual angle when processing the three-dimensional interaction model, thereby sending the two-dimensional video data to the conventional terminal of the user, so that the plurality of users can communicate with each other freely without being limited by device types.

In some embodiments of the present disclosure, a three-dimensional interaction model of a target object to be displayed is obtained; the three-dimensional interaction model is processed according to a visual angle of each user in a group video session, to obtain video data after visual angle conversion on the three-dimensional interaction model, and the video data is sent to terminals of a plurality of users, so that the plurality of users can experience the same three-dimensional interaction model at their own visual angles during the group video session, and communicate with each other through the three-dimensional interaction model, thereby improving the efficiency of the video session while expanding the communication manner.

In addition, when an operation instruction for the three-dimensional interaction model is received, the three-dimensional interaction model can be adjusted according to an operation manner corresponding to the operation instruction, thereby providing the user with a service of operating the three-dimensional interaction model. Moreover, the video data may be sent to the plurality of users based on the adjusted three-dimensional interaction model, so that the plurality of users interact based on the same three-dimensional interaction model, thereby further improving the efficiency of the video session.

In addition, at least two operation instruction obtaining manners are provided. Gesture feature data of a first user may be obtained, and when the gesture feature data matches with any operation manner of the three-dimensional interaction model, it is determined that an operation instruction corresponding to the operation manner is received. Alternatively, operation information of a second user with respect to a peripheral device may be obtained, and when the operation information matches with any operation manner, it is determined that an operation instruction corresponding to the operation manner is received. The operation instruction can be triggered according to the gesture of the user intelligently, and can also be triggered according to the operation information of the user. In this way, diversified operation instruction obtaining manners are provided, thereby achieving higher operability.

In addition, at least three processes of adjusting the three-dimensional interaction model according to the operation instruction are provided. For example, the three-dimensional interaction model is rotated according to a rotation operation instruction, the three-dimensional interaction model is scaled up or down according to a scaling operation instruction, and the three-dimensional interaction model is shifted according to a shift operation instruction, thereby providing diversified adjustment manners, enhancing interaction strength of the video session, and further improving the efficiency of the video session.

In addition, to make the group video session be performed in an orderly manner and emphasize a speaking process of a particular user, at least two methods for processing a speaking request are provided. For example, specified video data is generated, where the specified video data is used for displaying that a virtual microphone is transferred from a virtual host to a virtual character of a third use; alternatively, a volume of audio data of a fourth user is lowered.

In addition, at least two manners for obtaining the three-dimensional interaction model are provided. For example, a three-dimensional object model uploaded by a fifth user is obtained; alternatively, a two-dimensional table uploaded by a sixth user is obtained, and is processed to obtain the three-dimensional table model. In this way, diversified three-dimensional interaction models can be provided.

In addition, to further expand the communication manner during the video session, for example, when a multimedia file playing request is received, a multimedia file may be synthesized to the video data of the plurality of users, so that the plurality of users can share the multimedia file.

In addition, to provide an intelligent interaction service to prompt the user that the user is allowed to operate the three-dimensional interaction model and how to operate the three-dimensional interaction model, when it is detected that a seventh user gazes at the three-dimensional interaction model for longer than preset duration, it indicates that the seventh user probably needs to operate the three-dimensional interaction model. Therefore, operation prompt information can be sent to a terminal of the seventh user, so that the seventh user is prompted at an appropriate time to operate the three-dimensional interaction model.

Figure 21:
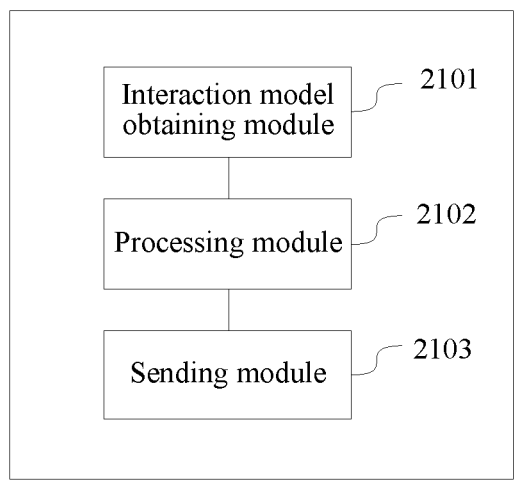
FIG. 21 is a block diagram of a group video session apparatus according to an embodiment of the present disclosure.

FIG. 21 is a block diagram of a group video session apparatus according to an embodiment of the present disclosure. Referring to FIG. 21, the apparatus specifically includes: an interaction model obtaining module 2101, configured to obtain, during a group video session, a three-dimensional interaction model of a target object to be displayed a processing module 2102, configured to process the three-dimensional interaction model of the target object according to a visual angle of each user of a plurality of users in the group video session, to obtain video data of the user, the video data of the user including model data obtained by performing visual angle conversion on the three-dimensional interaction model of the target object; and a sending module 2103, configured to send the video data of the plurality of users to terminals of the plurality of users respectively.

In some embodiments of the present disclosure, a three-dimensional interaction model of a target object to be displayed is obtained; the three-dimensional interaction model is processed according to a visual angle of each user in a group video session, to obtain video data after visual angle conversion on the three-dimensional interaction model, and the video data is sent to terminals of a plurality of users, so that the plurality of users can experience the same three-dimensional interaction model at their own visual angles during the group video session, and communicate with each other through the three-dimensional interaction model, thereby improving the efficiency of the video session while expanding the communication manner.

Figure 22:
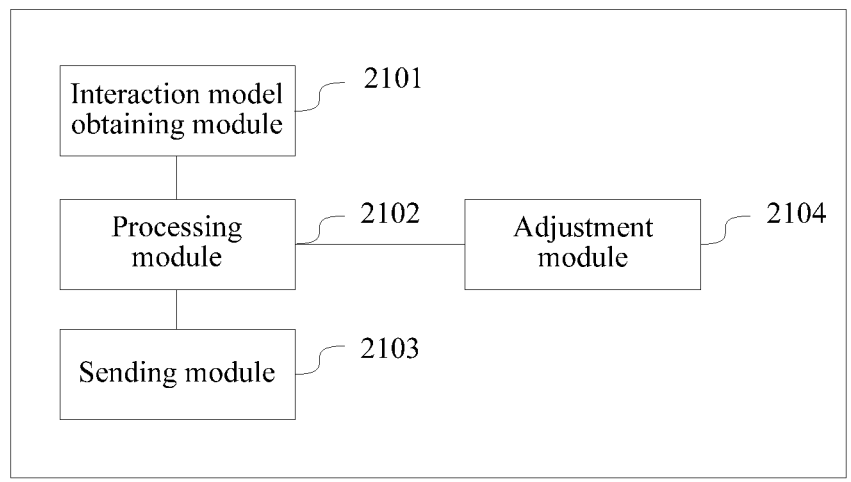
FIG. 22 is a block diagram of a group video session apparatus according to an embodiment of the present disclosure.

In a possible implementation, based on the composition of the apparatus in FIG. 21, referring to FIG. 22, the apparatus further includes an adjustment module 2104, where the adjustment module 2104 is configured to adjust, when an operation instruction for the three-dimensional interaction model is received, adjust the three-dimensional interaction model according to an operation manner corresponding to the operation instruction;

the processing module 2102 is configured to: based on the adjusted three-dimensional interaction model, perform processing according to the visual angle of each user of the plurality of users in the group video session; and the sending module 2103 is configured to send the video data that has been processed by the processing module according to the visual angle of each user of the plurality of users in the group video session.

Figure 23:
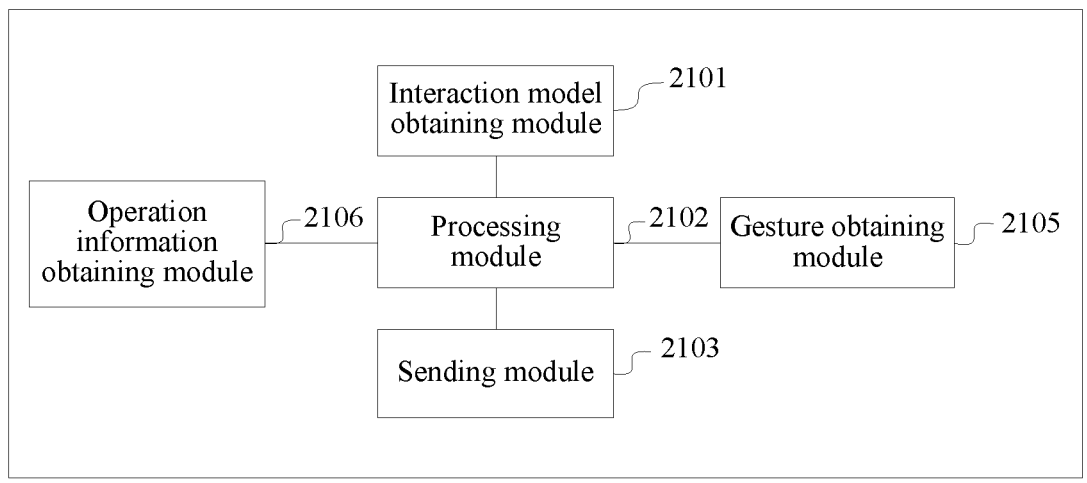
FIG. 23 is a block diagram of a group video session apparatus according to an embodiment of the present disclosure.

In a possible implementation, based on the composition of the apparatus in FIG. 21, referring to FIG. 23, the apparatus further includes:

a gesture obtaining module 2105, configured to obtain gesture feature data of a first user, and when the gesture feature data matches with any operation manner of the three-dimensional interaction model, determine that an operation instruction corresponding to the operation manner is obtained; or an operation information obtaining module 2106, configured to obtain operation information of a second user with respect to a peripheral device, and when the operation information matches with any operation manner of the three-dimensional interaction model, determine that an operation instruction corresponding to the operation manner is received, the peripheral device being bound to a terminal of the second user.

In a possible implementation, the adjustment module 2104 is configured to: when the operation instruction is a rotation operation instruction, obtain a rotation angle and a rotation direction corresponding to the rotation operation instruction, and rotate the three-dimensional interaction model according to the rotation angle and the rotation direction; and/or, the adjustment module is configured to: when the operation instruction is a scaling operation instruction, obtain a scaling-up ratio or a scaling-down ratio corresponding to the scaling operation instruction, and scale down or up the three-dimensional interaction model according to the scaling-down ratio and the scaling-up ratio; and/or, the adjustment module is configured to: when the operation instruction is a shift operation instruction, obtain a shift direction and a shift distance corresponding to the shift operation instruction, and shift the three-dimensional interaction model according to the shift direction and the shift distance.

Figure 24:
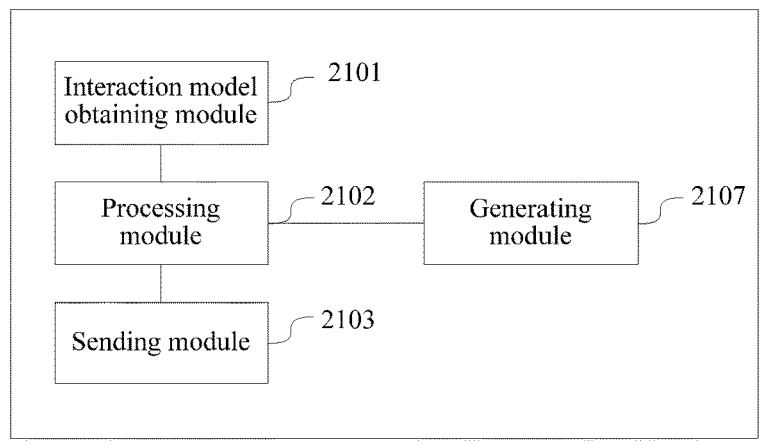
FIG. 24 is a block diagram of a group video session apparatus according to an embodiment of the present disclosure.

In a possible implementation, based on the composition of the apparatus in FIG. 21, referring to FIG. 24, the apparatus further includes:

a generating module 2107, configured to generate specified video data when a speaking request of a third user is received, the specified video data being used for displaying a process of transferring a virtual microphone from a virtual host to a virtual character of the third user, where the processing module 2102 is configured to: based on the specified video data, perform processing according to the visual angle of each user of the plurality of users in the group video session; and the sending module 2103 is configured to send the specified video data that has been processed by the processing module according to the visual angle of each user of the plurality of users in the group video session.

Figure 25:
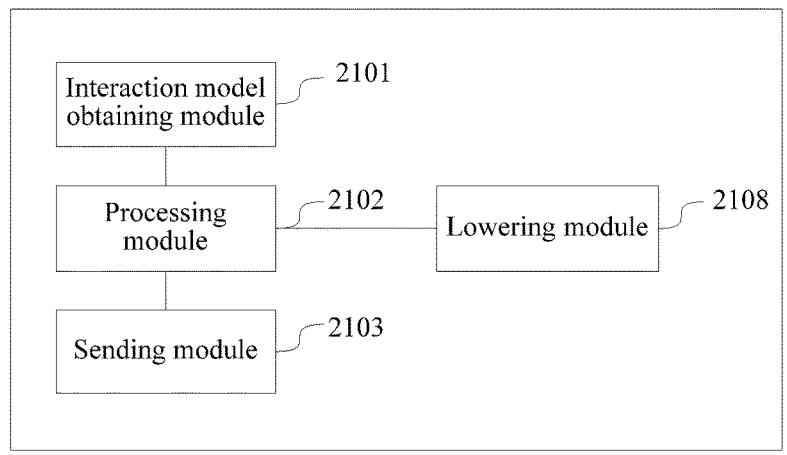
FIG. 25 is a block diagram of a group video session apparatus according to an embodiment of the present disclosure.

In a possible implementation, based on the composition of the apparatus in FIG. 21, referring to FIG. 25, the apparatus further includes:

a lowering module 2108, configured to lower a volume of audio data of a fourth user when a speaking request of a third user is received, the fourth user being a user other than the third user in the group video session, where the processing module 2102 is configured to: based on the adjusted audio data, perform processing according to the visual angle of each user of the plurality of users in the group video session; and the sending module 2103 is configured to send the video data that has been processed by the processing module according to the visual angle of each user of the plurality of users in the group video session.

In a possible implementation, the interaction model obtaining module 2101 is configured to obtain a three-dimensional object model uploaded by the fifth user; or the interaction model obtaining module 2101 is configured to obtain a two-dimensional table uploaded by a sixth user, and process the two-dimensional table to obtain the three-dimensional table model.

Figure 26:
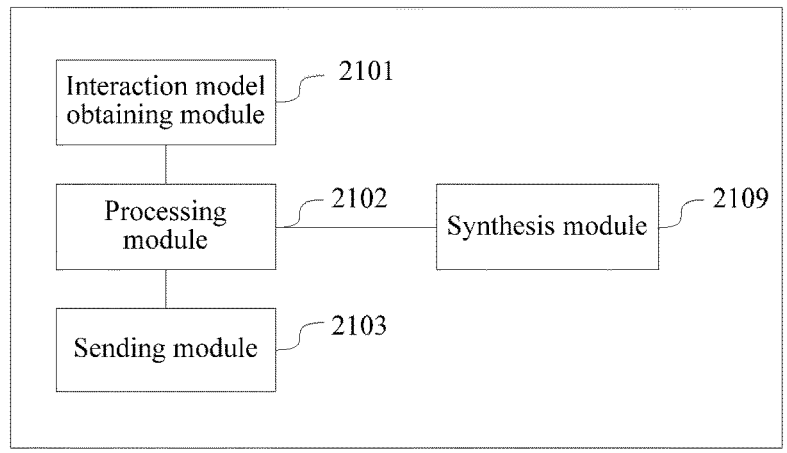
FIG. 26 is a block diagram of a group video session apparatus according to an embodiment of the present disclosure.

In a possible implementation, based on the composition of the apparatus in FIG. 21, referring to FIG. 26, the apparatus further includes a synthesis module 2109, configured to: when receiving a multimedia file playing request, synthesize a multimedia file corresponding to the multimedia playing request to the video data of the plurality of users.

In a possible implementation, the sending module 2103 is further configured to: when it is detected that the seventh user gazes at the three-dimensional interaction model for longer than preset duration, send operation prompt information to a terminal of the seventh user, the operation prompt information being used for prompting that the seventh user is capable of operating the three-dimensional interaction model.

All the optional technical solutions above may be combined in any manner to form optional embodiments of the present disclosure, which are not elaborated herein.

It should be noted that, when the group video session apparatus provided in the foregoing embodiment performs a group video session, the foregoing division of the functional modules is merely used as an example for description. In actual application, the foregoing functions may be completed by different functional modules as required. That is, the internal structure of the apparatus may be divided into different functional modules to complete all or some of the functions described above. In addition, the group video session apparatus provided in the foregoing embodiment belongs to the same conception as the embodiment of the group video communication method. For a specific implementation process of the apparatus, refer to the method embodiment; details are not described herein again.

Figure 27:
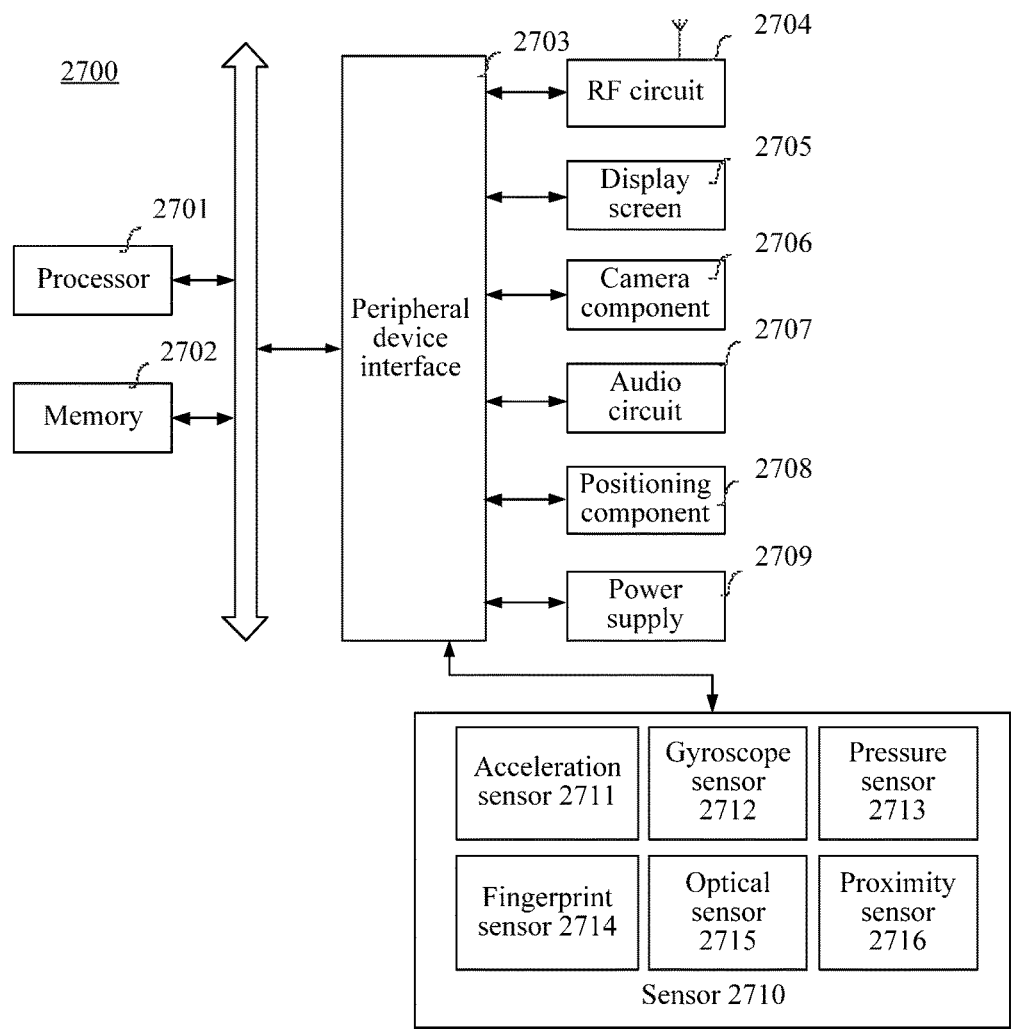
FIG. 27 is a structural block diagram of a terminal 2700 according to an exemplary embodiment of the present disclosure.

FIG. 27 is a structural block diagram of a terminal 2700 according to an exemplary embodiment of the present disclosure. The terminal 2700 may be a smart phone, a tablet computer, a Moving Picture Experts Group Audio Layer III (MP3) layer, a Moving Picture Experts Group Audio Layer IV (MP4) player, a notebook computer, or a desktop computer. The terminal 2700 may also be referred to as a user equipment, a portable terminal, a laptop terminal, a desktop terminal, or the like.

Generally, the terminal 2700 includes a processor 2701 and a memory 2702.

The processor 2701 may include one or more processing cores, for example, the processor is a 4-core processor or an 8-core processor. The processor 2701 may be implemented by using at least one of the following hardware forms: digital signal processing (DSP), a field-programmable gate array (FPGA), and a programmable logic array (PLA). The processor 2701 may also include a main processor and a co-processor. The main processor is a processor for processing data in a wakeup state, and is also referred to as a central processing unit (CPU). The co-processor is a low-power processor for processing data in a standby state. In some embodiments, the processor 2701 may be integrated with a graphics processing unit (GPU), and the GPU is responsible for rendering and drawing content that needs to be displayed on a display screen. In some embodiments, the processor 2701 may further include an artificial intelligence (AI) processor. The AI processor is used for computing operations related to machine learning.

The memory 2702 may include one or more computer readable storage media. The computer readable storage medium may be non-transient. The memory 2702 may further include a high-speed random access memory and a nonvolatile memory, for example, one or more disk storage devices, and a flash memory storage device. In some embodiments, the non-transient computer readable storage medium in the memory 2702 is configured to store at least one instruction, and the at least one instruction is used for being executed by the processor 2701 to implement the group video communication method provided in the embodiments of this application.

In some embodiments, the terminal 2700 may further include a peripheral device interface 2703 and at least one peripheral device. The processor 2701, the memory 2702, and the peripheral device interface 2703 may be connected through a bus or a signal line. Each peripheral device may be connected to the peripheral device interface 2703 through a bus, a signal line, or a circuit board. Specifically, the peripheral device includes at least one of a radio frequency (RF) circuit 2704, a touch display screen 2705, a camera 2706, an audio circuit 2707, a positioning component 2708, and a power supply 2709.

The peripheral device interface 2703 may be configured to connect at least one input/output (I/O)-related peripheral device to the processor 2701 and the memory 2702. In some embodiments, the processor 2701, the memory 2702, and the peripheral device interface 2703 are integrated on the same chip or circuit board. In some other embodiments, any one or two of the processor 2701, the memory 2702, and the peripheral device interface 2703 may be implemented on a separate chip or circuit board, which is not limited in this embodiment.

The RF circuit 2704 is configured to receive and send an RF signal, which is also referred to as an electromagnetic signal. The RF circuit 2704 communicates with a communications network and other communications devices through electromagnetic signals. The RF circuit 2704 converts an electric signal into an electromagnetic signal and sends the electromagnetic signal, or converts a received electromagnetic signal into an electric signal. Optionally, the RF circuit 2704 includes: an antenna system, an RF transceiver, one or more amplifiers, a tuner, an oscillator, a digital signal processor, a codec chip set, a subscriber identity module card, or the like. The RF circuit 2704 can communicate with other terminals through at least one wireless communications protocol. The wireless communications protocol may include, but is not limited to: a metropolitan area network, all generations of mobile communications networks (2G, 3G, 4G, and 5G), a wireless local area network and/or a Wireless Fidelity (Wi-Fi) network. In some embodiments, the RF circuit 2704 may further include a circuit related to a Near Field Communication (NFC), which is not limited in this application.

The display screen 2705 is configured to display a user interface (UI). The UI may include a graph, a text, an icon, a video, or any combination thereof. When the display screen 2705 is a touch display screen, the display screen 2705 is further capable of capturing a touch signal on or above the surface of the display screen 2705. The touch signal may be input as a control signal into the processor 2701 for processing. In this case, the display screen 2705 may further be configured to provide a virtual button and/or a virtual keyboard, which is also referred to as a soft button and/or a soft keyboard. In some embodiments, there is one display screen 2705, which is disposed on a front panel of the terminal 2700. In some other embodiments, there may also be at least two display screens 2705, which are separately disposed on different surfaces of the terminal 2700 or designed in a folded manner. In yet some other embodiments, the display screen 2705 may be a flexible display screen disposed on a bent surface or folded sides of the terminal 2700. The display screen 2705 may even be set as a non-rectangular irregular screen, that is, a special-shaped screen. The display screen 2705 may be prepared by using a material such as a liquid crystal display (LCD) or an organic light-emitting diode (OLED).

The camera component 2706 is configured to capture images or videos. Optionally, the camera component 2706 includes a front camera and a rear camera. Generally, the front camera is disposed on the front panel of the terminal, and the rear camera is disposed on the rear side of the terminal. In some embodiments, there are at least two rear cameras, each rear camera being any one of a main camera, a depth-of-field camera, a wide angle camera, and a long-focus camera, so that the main camera is fused with the depth-of-field camera to implement a bokeh function, the main camera is fused with the wide angle camera to implement panoramic shooting and a VR shooting function or other fusion shooting functions. In some embodiments, the camera component 2706 may further include a flash light. The flash light may be a flash light with a single color temperature, or a flash light with double color temperatures. The flash light with double color temperatures refers to a combination of a warm flash light and a cold flash light, which can be used for light compensation under different color temperatures.

The audio circuit 2707 may include a microphone and a loudspeaker. The microphone is configured to capture acoustic waves of a user and an environment, convert the acoustic waves into electric signals, and input the electric signals into the processor 2701 for processing, or input the electric signals into the RF circuit 2704 to implement voice communication. For the purpose of stereo and de-noising, there may be a plurality of microphones disposed at different parts of the terminal 2700 respectively. The microphone may also be an array microphone or a microphone for omnidirectional capturing. The loudspeaker is configured to convert an electric signal from the processor 2701 or the RF circuit 2704 into an acoustic wave. The loudspeaker may be a conventional diaphragm loudspeaker, or may be a piezoceramic loudspeaker. When the loudspeaker is a piezoceramic loudspeaker not only can convert an electric signal into an acoustic wave audible to the human ear, but also can convert an electric signal into an acoustic wave non-audible to the human ear, for use in ranging and the like. In some embodiments, the audio circuit 2707 may further include a headset jack.

The positioning component 2708 is configured to determine a current geographical location of the terminal 2700, so as to implement navigation or a location based service (LBS). The positioning component 2708 may be a positioning component based on the Global Positioning System (GPS) of the US, the Beidou system of China, the GLONASS system of Russia, and the Galileo system of the EU.

The power supply 2709 is configured to supply power for the components in the terminal 2700. The power supply 2709 may be an alternating current, a direct current, a disposable battery or a rechargeable battery. When the power supply 2709 includes a rechargeable battery, the rechargeable battery can support wired charging or wireless charging. The rechargeable battery can also be used for supporting a rapid charge technology.

In some embodiments, the terminal 2700 further includes one or more sensors 2710. The one or more sensors 2710 include, but are not limited to: an acceleration sensor 2711, a gyroscope sensor 2712, a pressure sensor 2713, a fingerprint sensor 2714, an optical sensor 2715, and a proximity sensor 2716.

The acceleration sensor 2711 can detect the magnitude of accelerations on three coordinate axes of a coordinate system established by the terminal 2700. For example, the acceleration sensor 2711 may be configured to detect components of the gravitational acceleration on the three coordinate axes. The processor 2701 may control, according to gravity acceleration signals captured by the acceleration sensor 2711, the touch display screen 2705 to display the UI in a horizontal-view mode or a vertical-view mode. The acceleration sensor 2711 may be further configured to capture motion data of a game or a user.

The gyroscope sensor 2712 may detect a body direction and a rotation angle of the terminal 2700. The gyroscope sensor 2712 may coordinate with the acceleration sensor 2711 to capture 3D actions performed by a user on the terminal 2700. The processor 2701 can implement the following functions according to data captured by the gyroscope sensor 2712: motion sensing (for example, changing the UI according to a tilting operation of the user), image stabilization during shooting, game control, and inertia navigation.

The pressure sensor 2713 may be disposed on a side frame of the terminal 2700 and/or a lower layer of the touch display screen 2705. When disposed on the side frame of the terminal 2700, the pressure sensor 2713 can detect a holding signal of the user with respect to the terminal 2700, and the processor 2701 performs a left/right hand recognition or a shortcut operation according to the holding signal captured by the pressure sensor 2713. When the pressure sensor 2713 is disposed at the lower layer of the touch display screen 2705, the processor 2701 implements control over an operable control on the UI according to a pressure operation performed by the user on the touch display screen 2705. The operable control includes at least one of a button control, a scroll bar control, an icon control, and a menu control.

The fingerprint sensor 2714 is configured to capture a fingerprint of the user, and the processor 2701 identifies the user according to the fingerprint captured by the fingerprint sensor 2714. Alternatively, the fingerprint sensor 2714 identifies the user according to the captured fingerprint. When it is identified that the user has a trusted identity, the processor 2701 authorizes the user to perform a related sensitive operation. The sensitive operation includes unlocking the screen, viewing encrypted information, downloading software, payment, changing settings, and the like. The fingerprint sensor 2714 may be disposed on the front side, rear side, or lateral side of the terminal 2700. When the terminal 2700 is provided with a physical button or a vender logo, the fingerprint sensor 2714 may be integrated with the physical button or the vender logo.

The optical sensor 2715 is configured to capture ambient light intensity. In an embodiment, the processor 2701 may control display brightness of the touch display screen 2705 according to the ambient light intensity captured by the optical sensor 2715. Specifically, when the ambient light intensity is high, the display brightness of the touch display screen 2705 is increased; and when the ambient light intensity is low, the display brightness of the touch display screen 2705 is decreased. In another embodiment, the processor 2701 may further dynamically adjust shooting parameters of the camera component 2706 according to the ambient light intensity captured by the optical sensor 2715.

The proximity sensor 2716 is also referred to as a range sensor, and is generally disposed on the front panel of the terminal 2700. The proximity sensor 2716 is configured to capture a distance between the user and the front side of the terminal 2700. In an embodiment, when the proximity sensor 2716 detects that the distance between the user and the front side of the terminal 2700 decreases gradually, the processor 2701 controls the touch display screen 2705 to switch from a screen-on state to a screen-off state. When the proximity sensor 2716 detects that the distance between the user and the front side of the terminal 2700 increases gradually, the processor 2701 controls the touch display screen 2705 to switch from a screen-off state to a screen-on state.

A person skilled in the art can understand that the structure shown in FIG. 27 does not constitute a limitation to the terminal 2700, and the terminal 2700 may include more components or fewer components than those shown in the figure, or some components may be combined, or a different component deployment may be used.

Figure 28:
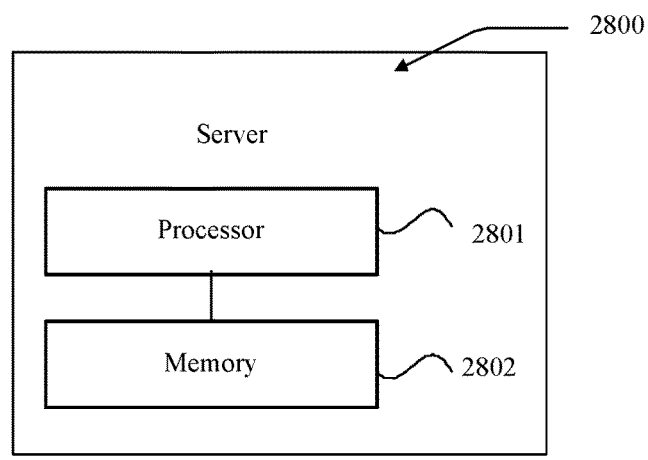
FIG. 28 is a block diagram of a network device according to an embodiment of the present disclosure.

FIG. 28 is a schematic structural diagram of a network device according to an embodiment of the present disclosure. The network device 2800 may vary a lot due to different configurations or performance, and may include one or more processors (CPUs) 2801 and one or more memories 2802. At least one instruction is stored in the memory 2802. The at least one instruction is loaded and executed by the processor 2801, so as to implement the methods provided in the foregoing method embodiments. Definitely, the network device may further have a wired or wireless network interface, a keyboard, an I/O interface, and other components, to facilitate I/O. The network device may further include other components for implementing device functions, and details are not described herein again.

In an exemplary embodiment, a computer readable storage medium is further provided, for example, a memory including instructions. The instructions may be executed by a processor in a terminal to complete a resource delivering method or a resource receiving method in the following embodiments. For example, the computer readable storage medium may be a read-only memory (ROM), a random access memory (RAM), a compact disc read-only memory (CD-ROM), a magnetic tape, a floppy disk, and an optical data storage device.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a ROM, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A group video communication method, applied to a network device, the method comprising:
    creating a group video session;
    for each user in the group video session,
        determining a user type of the user according to device information of the user, the user type comprising common user and virtual user, the common user indicating that the user uses a two-dimensional display mode when participating in the group video session, and the virtual user indicating that the user uses a virtual reality (VR) display mode when participating in the group video session;
        obtaining target video data of the user by processing video data of the group video session according to a video display mode indicated by the user type of the user, a video display mode of the target video data matching with the video display mode indicated by the user type of the user; and
        sending the target video data to a user equipment of the user during the group video session, so that the user equipment presents the target video data of the group video session in the video display mode indicated by the user type of the user;
    obtaining a virtual character of a first user in the group video session when creating the group video session, the virtual character of the first user being obtained at least according to head feature data of the first user and a body model corresponding to the first user; and
    obtaining video data of the first user based on the virtual character of the first user and behavior feature data of the first user during the group video session, a movement of the virtual character of the first user in the video data of the first user matching with an actual movement of the first user;
    wherein the behavior feature data comprises sight direction feature data, and the obtaining video data of the first user based on the virtual character of the first user and behavior feature data of the first user comprises:
        obtaining eye image data of the first user captured by a camera of the first user:
        obtaining the sight direction feature data of the first user according to the eye image data of the first user; and
        mapping the sight direction feature data of the first user to the head model of the virtual character of the first user in real time, to obtain the video data of the first user.

2. The method according to claim 1, wherein the processing video data of the group video session according to a video display mode indicated by the user type of the user comprises: when the user type of the user is common user,
    converting a three-dimensional virtual character corresponding to each virtual user in the group video session into a two-dimensional virtual character;
    obtaining, for each virtual user in the group video session, a first two-dimensional video data by integrating the two-dimensional virtual character, a two-dimensional background selected by the virtual user, and audio data corresponding to the virtual user; and
    obtaining the target video data of the user by integrating the first two-dimensional video data of at least one virtual user and second two-dimensional video data, the second two-dimensional video data being a two-dimensional video data of a common user in the group video session.

3. The method according to claim 1, wherein the processing video data of the group video session according to a video display mode indicated by the user type of the user comprises: when the user type of the user is virtual user,
    determining a virtual environment corresponding to the group video session;
    determining a display position of each user of the group video session in the virtual environment by using the virtual environment as a three-dimensional background;
    generating, for each common user in the group video session, specified video data of the common user designated for the display position corresponding to the common user;
    obtaining, for each virtual user in the group video session, a three-dimensional virtual character and audio data of the virtual user designated for the display position corresponding to the virtual user; and
    obtaining the target video data of the user by integrating the specified video data of at least one common user and the three-dimensional virtual character and the audio data of at least one virtual user based on the corresponding display positions.

4. The method according to claim 3, wherein before the generating, for each virtual user in the group video session, a three-dimensional virtual character and audio data of the virtual user designated for the display position corresponding to the virtual user, the method further comprises:
    upon determining that the common user comprises a first common user, converting two streams of two-dimensional video data of the first common user into first three-dimensional video data, and using the first three-dimensional video data as the specified video data, the first common user being a common user using a stereo camera, or using the two streams of two-dimensional video data of the first common user as the specified video data; and
    upon determining that the common user comprises a second common user, using two-dimensional video data of the second common user as the specified video data, the second common user being a common user using a monocular camera.

5. The method according to claim 3, wherein the determining a virtual environment corresponding to the group video session comprises:
    determining a virtual environment corresponding to a virtual environment option triggered by the user as the virtual environment corresponding to the user in the group video session; or
    determining a virtual environment capacity corresponding to the group video session according to a quantity of users in the group video session, and determining a virtual environment satisfying the virtual environment capacity as the virtual environment corresponding to the group video session; or tallying virtual environments that have been selected by each user in the group video session, to obtain a number of times that each virtual environment is selected, and determining a virtual environment selected for the largest number of times as the virtual environment corresponding to the group video session.

6. The method according to claim 3, wherein the determining a display position of each user of the group video session in the virtual environment comprises:

determining, according to social data between the user and other users in the group video session, degrees of intimacy between the user and the other users, and arranging display positions of the other users starting from any side of the user in descending order of the degrees of intimacy; or obtaining user identities of the other users, determining a position opposite to the user as a display position of a user with the highest user identity in the other users, and randomly determining display positions of remaining users in the other users; or arranging display positions of the other users starting from any side of the user according to a time sequence in which the other users join the group video session; or determining, according to a position selected by the user in the virtual environment, the position selected by the user as a display position of the user in the virtual environment; or determining a position opposite to the user as a display position of a common user, and randomly determining display positions of remaining users in the other users.

7. The method according to claim 1, wherein the obtaining a virtual character of a first user in the group video session comprises:

obtaining the head feature data of the first user;
generating, according to the head feature data, a head model matching with the head feature data;
determining the body model corresponding to the first user according to a user attribute of the first user; and
integrating the head model with the body model, to obtain the virtual character of the first user.

8. The method according to claim 7, wherein the determining the body model corresponding to the first user according to a user attribute of the first user comprises at least one of:

determining the body model of the first user according to gender data of the first user;
determining the body model of the first user according to age data of the first user; or
determining the body model of the first user according to occupation data of the first user.

9. The method according to claim 1, wherein:

the behavior feature data comprises expression feature data, and the obtaining video data of the first user based on the virtual character of the first user and behavior feature data of the first user comprises: obtaining, when it is detected that the expression feature data of the first user is specified expression feature data, body feature data corresponding to the specified expression feature data; and mapping the specified expression feature data to the head model of the virtual character of the first user in real time, and mapping the body feature data to the body model of the virtual character of the first user in real time, to obtain the video data of the first user; or the behavior feature data comprises mouth feature data, and the obtaining video data of the first user based on the virtual character of the first user and behavior feature data of the first user comprises: mapping the mouth feature data of the first user to the head model of the virtual character of the first user in real time, to obtain the video data of the first user.

10. The method according to claim 1, wherein the behavior feature data comprises head orientation feature data, and the obtaining video data of the first user based on the virtual character of the first user and behavior feature data of the first user comprises:

obtaining head orientation data of the first user captured by a sensor of the first user; and
mapping the head orientation feature data of the first user to the head model of the virtual character of the first user in real time, to obtain the video data of the first user.

11. The method according to claim 1, wherein the obtaining video data of the first user based on the virtual character of the first user and behavior feature data of the first user comprises:

obtaining initial video data of the first user based on the virtual character of the first user and the behavior feature data of the first user;
obtaining visual angle data of a second user; and
processing the initial video data according to a visual angle indicated by the visual angle data of the second user, to obtain video data of the first user which matches with the visual angle.

12. The method according to claim 1, comprising:

obtaining a three-dimensional interaction model of a target object to be displayed;
for each user of a plurality of users in the group video session,
processing, the three-dimensional interaction model of the target object during the group video session according to a visual angle of the user, to obtain video data of the user, the video data of the user comprising model data obtained by performing visual angle conversion on the three-dimensional interaction model of the target object; and
sending the video data of the user to the user equipment of the user.

13. The method according to claim 1, further comprising:

lowering a volume of audio data of a fourth user when receiving a speaking request of a third user, the fourth user being a user other than the third user in the group video session.

14. The method according to claim 12, wherein the obtaining a three-dimensional interaction model of a target object to be displayed comprises:

obtaining a three-dimensional object model uploaded by a fifth user; or
obtaining a two-dimensional table uploaded by a sixth user, and processing the two-dimensional table, to obtain a three-dimensional table model.

15. The method according to claim 1, further comprising:

integrating, when receiving a multimedia file playing request, a multimedia file corresponding to the multimedia playing request into video data of a plurality of users in the group video session.

16. The method according to claim 12, wherein after the obtaining, during the group video session, a three-dimensional interaction model of a target object to be displayed, the method further comprises:
sending, when it is detected that a period of a seventh user gazing at the three-dimensional interaction model is longer than a preset duration, operation prompt information to a terminal of the seventh user, the operation prompt information indicating that the three-dimensional interaction model is interactive and responds to user operations.

17. A network device, comprising a memory and a processor, wherein the memory is configured to store instructions, and the processor is configured to execute the instructions, so as to perform:
creating a group video session;
for each user in the group video session,
determining a user type of the user according to device information of the user, the user type comprising common user and virtual user, the common user indicating that the user uses a two-dimensional display mode when participating in the group video session, and the virtual user indicating that the user uses a virtual reality (VR) display mode when participating in the group video session;
obtaining target video data of the user by processing video data of the group video session according to a video display mode indicated by the user type of the user, a video display mode of the target video data matching with the video display mode indicated by the user type of the user; and
sending the target video data to a user equipment of the user during the group video session, so that the user equipment presents the target video data of the group video session in the video display mode indicated by the user type of the user;
obtaining a virtual character of a first user in the group video session when creating the group video session, the virtual character of the first user being obtained at least according to head feature data of the first user and a body model corresponding to the first user; and
obtaining video data of the first user based on the virtual character of the first user and behavior feature data of the first user during the group video session, a movement of the virtual character of the first user in the video data of the first user matching with an actual movement of the first user;
wherein the behavior feature data comprises sight direction feature data, and the obtaining video data of the first user based on the virtual character of the first user and behavior feature data of the first user comprises:
obtaining eye image data of the first user captured by a camera of the first user:
obtaining the sight direction feature data of the first user according to the eye image data of the first user; and
mapping the sight direction feature data of the first user to the head model of the virtual character of the first user in real time, to obtain the video data of the first user.

18. A non-transitory computer-readable storage medium storing computer program instructions executable by at least one processor to perform:
creating a group video session;
for each user in the group video session,
determining a user type of the user according to device information of the user, the user type comprising common user and virtual user, the common user indicating that the user uses a two-dimensional display mode when participating in the group video session, and the virtual user indicating that the user uses a virtual reality (VR) display mode when participating in the group video session;
obtaining target video data of the user by processing video data of the group video session according to a video display mode indicated by the user type of the user, a video display mode of the target video data matching with the video display mode indicated by the user type of the user; and
sending the target video data to a user equipment of the user during the group video session, so that the user equipment presents the target video data of the group video session in the video display mode indicated by the user type of the user;
obtaining a virtual character of a first user in the group video session when creating the group video session, the virtual character of the first user being obtained at least according to head feature data of the first user and a body model corresponding to the first user; and
obtaining video data of the first user based on the virtual character of the first user and behavior feature data of the first user during the group video session, a movement of the virtual character of the first user in the video data of the first user matching with an actual movement of the first user;
wherein the behavior feature data comprises sight direction feature data, and the obtaining video data of the first user based on the virtual character of the first user and behavior feature data of the first user comprises:
obtaining eye image data of the first user captured by a camera of the first user:
obtaining the sight direction feature data of the first user according to the eye image data of the first user; and
mapping the sight direction feature data of the first user to the head model of the virtual character of the first user in real time, to obtain the video data of the first user.

* * * * *